United States Patent
Sumiyoshi et al.

(10) Patent No.: US 7,082,161 B2
(45) Date of Patent: Jul. 25, 2006

(54) TELEVISION/CINEMA SCHEME IDENTIFICATION APPARATUS AND IDENTIFICATION METHOD

(75) Inventors: Masatoshi Sumiyoshi, Kawasaki (JP); Kazuyuki Kazama, Yokohama (JP); Toshimasa Ohtsuki, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 10/919,316

(22) Filed: Aug. 17, 2004

(65) Prior Publication Data

US 2005/0078213 A1    Apr. 14, 2005

(30) Foreign Application Priority Data

Aug. 22, 2003    (JP) ............................. 2003-298740

(51) Int. Cl.
  H04N 7/12       (2006.01)
  H04N 9/47       (2006.01)
(52) U.S. Cl. .................... 375/240.01; 375/240; 348/96
(58) Field of Classification Search ........... 375/240.01, 375/240, 240.12, 240.16; 348/96
  See application file for complete search history.

(56) References Cited

U.S. PATENT DOCUMENTS 5,563,651 A    10/1996  Christopher
6,408,024 B1    6/2002  Nagao et al.
6,442,203 B1 *  8/2002  Demos .................. 375/240.16
2002/0135697 A1    9/2002  Wredenhagen et al.

FOREIGN PATENT DOCUMENTS

| JP | 9-18784 | 1/1997 |
| JP | 2002-290927 | 10/2002 |
| JP | 2002-330311 | 11/2002 |
| JP | 2003-78926 | 3/2003 |

* cited by examiner

*Primary Examiner*—Allen Wong
(74) *Attorney, Agent, or Firm*—Oblon, Spivak, McClelland, Maier & Neustadt, P.C.

(57) ABSTRACT

A television/cinema scheme identification apparatus comprising a signal common processing section which acquires a field correlation pattern, a first pull-down identifying section which acquires an identification output of a first type pull-down scheme, and a second pull-down identifying section which acquires an identification output of a second type pull-down scheme, wherein the field correlation pattern is set identical in data length to the first and second comparison patterns with which the field correlation pattern is compared, and the first and second comparison patterns have a data length such that a mutually exclusive pattern relationship between the first and second comparison patterns is established.

20 Claims, 10 Drawing Sheets

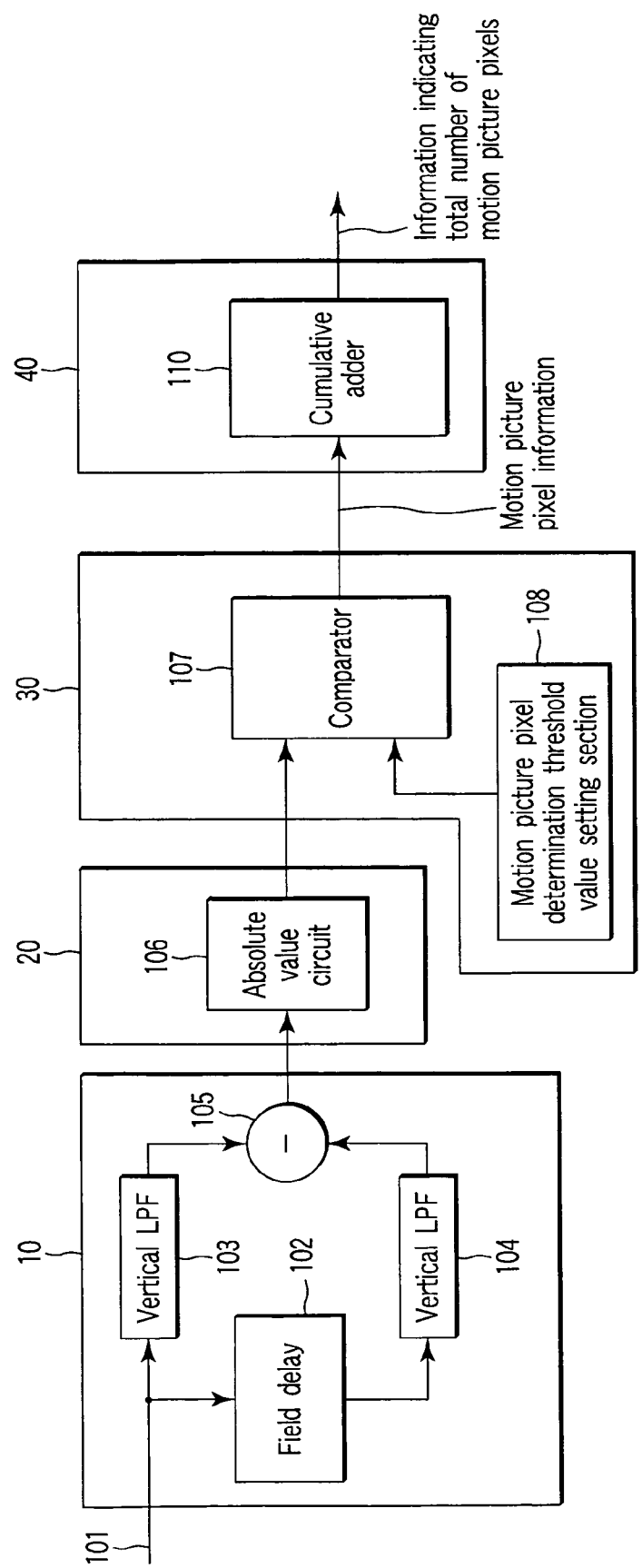
F I G. 2

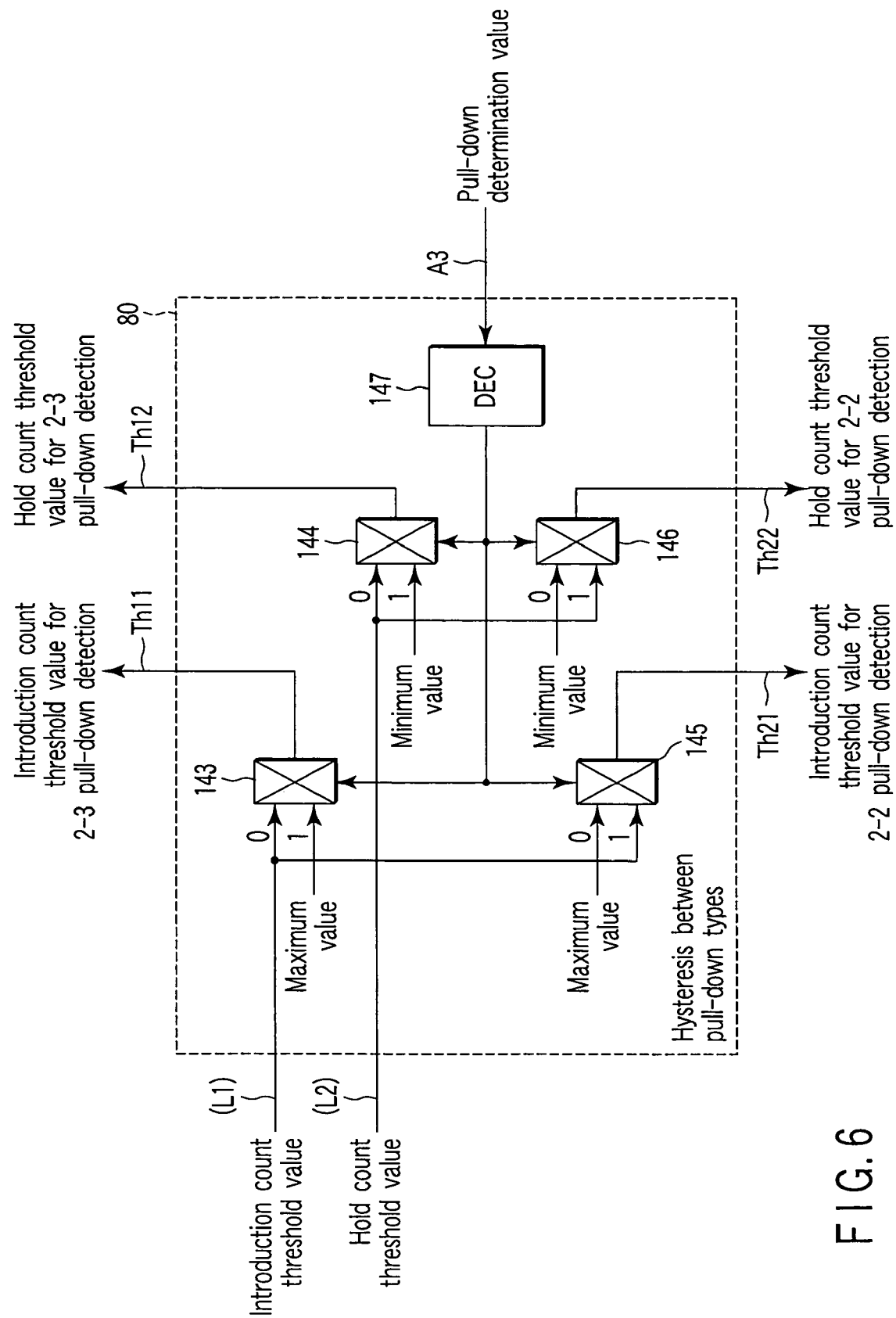
F I G. 6

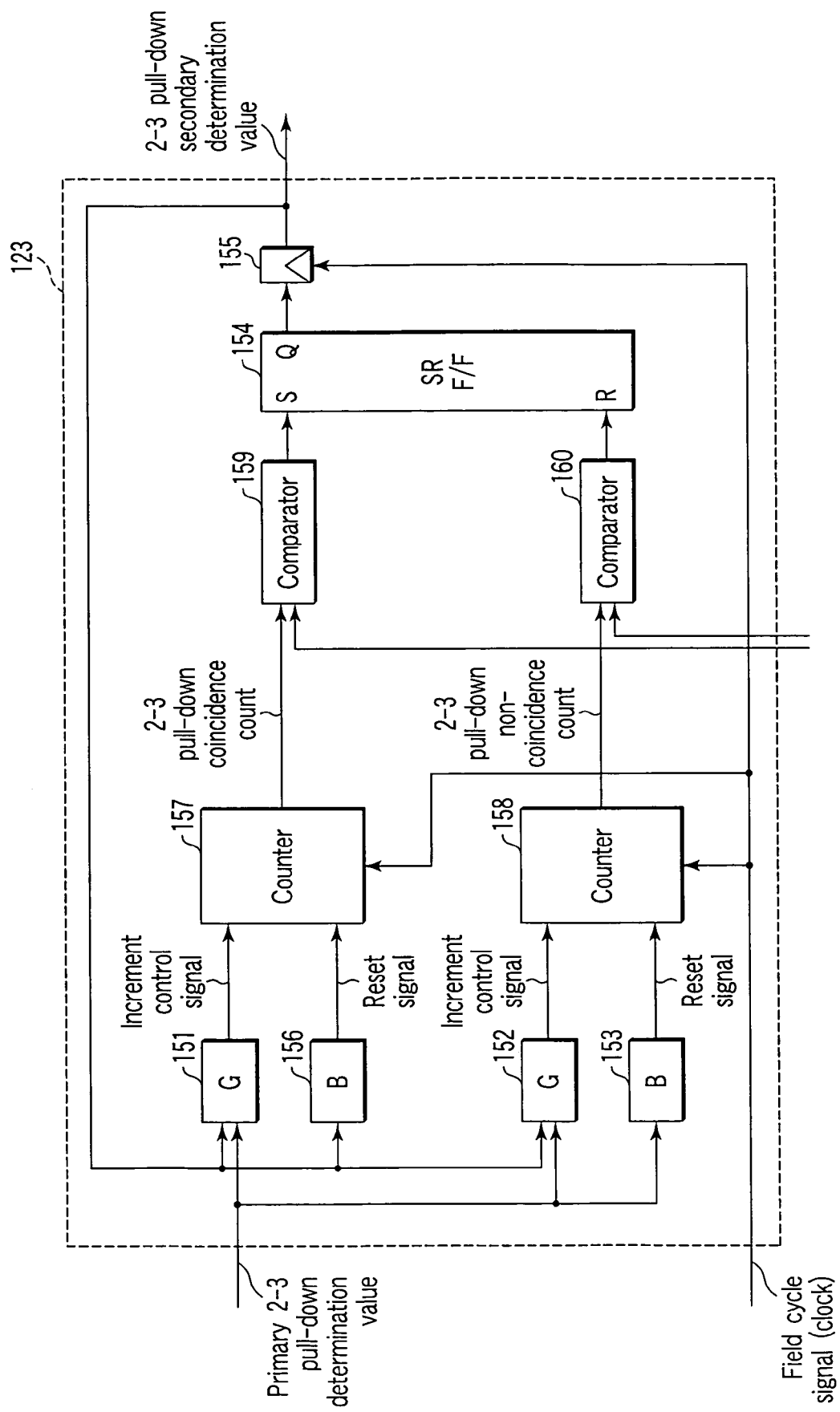
F I G. 8

TELEVISION/CINEMA SCHEME IDENTIFICATION APPARATUS AND IDENTIFICATION METHOD

CROSS-REFERENCE TO RELATED APPLICATIONS

This application is based upon and claims the benefit of priority from prior Japanese Patent Application No. 2003-298740, filed Aug. 22, 2003, the entire contents of which are incorporated herein by reference.

BACKGROUND OF THE INVENTION

1. Field of the Invention

The present invention relates to a television/cinema scheme identification apparatus and identification method capable of precisely identifying whether a video signal image has been acquired by means of a general video camera or a picture of a cinema film has been converted into the video signal image.

2. Description of the Related Art

In recent years, there have been a picture of a cinema film, a picture caused by computer graphics (hereinafter, referred to as a CG), and a picture acquired as an image by means of a general video camera as sources of the video signal image. Thus, a television broadcast signal in an NTSC scheme or a PAL scheme and a video disk reproduction signal often include a cinema film image signal or a video signal caused by the CG. In addition, in recent years, there has been a case in which picture signals of a variety of sources coexist with an increased recording capacity of a recording medium (for example, a DVD (digital versatile disk) or a hard disk) and digitization of a transmission scheme.

A cinema film has 24 frames per second; an NTSC standard television signal is provided as a picture signal for interlace scanning in 60 fields per second; and a PAL standard television signal is provided as a picture signal for interlace scanning in 50 fields per second. Therefore, a picture of a cinema film and a CG picture are subjected to television/cinema conversion, and the converted images are produced as an NTSC television signal or a PAL television signal.

As the television/cinema scheme, a 2-3 pull-down scheme and a 2-2 pull-down scheme are known. The 2-3 pull-down scheme is provided as a scheme utilized when a cinema film of 24 frames per second is converted into an NTSC television signal. In this scheme, 2 frames are divided into 5 fields, and 2 or 3 fields produced from an identical frame are designated by identical alphabetical letters. If a numeric value is subscribed with respect to a time series, it is designated by a 5-field sequence like A1, A2, B1, B2, B3, C1, C2, D1, D2, D3 or the like.

On the other hand, the 2-2 pull-down scheme is provided as a scheme which can be utilized when a CG picture is converted into an NTSC television signal. 1 frame is divided into 2 fields, and 2 fields produced from an identical frame are designated by identical alphabetical letters. If a numeric value is subscribed with respect to a time series, it is designated by a 2-field sequence like A1, A2, B1, B2, C1, C2, D1, D2 and the like. Further, the 2-2 pull-down scheme, for example, is adopted when a film picture of 24 frame per second is converted roughly into a video signal of 50 Hz (50 fields per second).

On the other hand, to respond to a user's demand, a scanning line conversion processing apparatus for converting an interlace signal into a non-interlace or a progressive signal has become available for a video signal processing section in recent years so as to produce a high quality and wide screen display image.

In the meantime, in the case of carrying out scanning line conversion processing, it is necessary to identify a source of the above-described video signal. This is because, after two fields composed of interlace signals has been subjected to line interpolation in a superimposed manner, when the interlaced signals are converted into non-interlace signals, if the two fields to be used are not fields from an identical source (a same frame), the quality of the acquired image is degraded.

Conventionally, a number of proposals have been made as a television/cinema scheme identification apparatus for identifying a source of a pulled-down video signal.

In particular, there has been a technique for achieving identification of a 2-3 pulled-down video signal and identification of a 2-2 pulled-down video signal by a single apparatus. This technique is disclosed in an embodiment of Jpn. Pat. Appln. KOKAI Publication No. 9-18784. In this embodiment, with attention being paid to a vertical synchronizing frequency of an input video signal, when a field frequency is 60 Hz, a 2-3 pull-down scheme identification circuit is operated, and when a field frequency is 50 Hz, a 2-2 pull-down scheme identification circuit is operated. Thus, in the case where an NTSC signal having a vertical synchronizing frequency of 60 Hz is a 2-2 pulled-down video signal, it is difficult to make identification.

In addition, as another prior art, there is a technique disclosed in Jpn. Pat. Appln. KOKAI Publication No. 2003-78926. In this art, identification between a 2-3 pulled-down video signal and a 2-2 pulled-down video signal are individually carried out by utilizing a property of a video signal itself. Thus, this technique may cause a problem from the practical point of view.

The 2-3 pulled-down video signal is identified by computing a difference between frames with respect to an input video signal. The 2-2 pulled-down video signal is identified by computing a difference between fields. Therefore, it is easily predicted that a majority of identification schemes of both of these systems have different circuit constructions, and that identification sensitivities between the identification schemes of both of the systems are different from each other. In addition, it is expected that there will be a trouble in adjustment for identifying the sensitivities of identification schemes of both of these systems. Further, there is a danger as to whether or not there exists a case in which results obtained from these 2 identification schemes compete with each other with respect to the same input video signal. Identification for a video signal in the 2-2 pull-down scheme can be carried out in a small number of field intervals, and is carried out prior to identification for a video signal in the 2-3 pull-down scheme. Therefore, it is not possible to overcome a question as to whether or not a deviation of identification sensitivities occurs.

Further, as another prior art, there is a technique disclosed in Jpn. Pat. Appln. KOKAI Publication No. 2002-330311. In this technique, there is provided a construction such that identification of a picture source is made by comparing 6 pixels, for example, in a coordinate block in which a picture signal in a current field is equal to a picture signal before 2 fields, so as to form hysteresis with respect to identification due to a change of a threshold value during this identification.

However, as described above, in the prior art, identification of a 2-3 pull-down video signal, a 2-2 pull-down video signal, and a general video signal merely proves its feasibility, and has a number of problems at a practical level. In addition, even if the identification sensitivity can be increased to an extent such that it reaches a practical level, there is a trouble with making such adjustment, leading to an increase of an adjustment period up to shipment of a picture processing product and causing high cost of a picture processing product. Additionally, no countermeasure is taken against an incorrect identification inducting picture pattern which may cause due to a picture pattern, and a danger of incorrect identification cannot be eliminated on a practical level.

Currently, there are many cases in which a picture element is produced by using a computer graphics composing technique (hereinafter, referred to as a CG composing technique). The CG has an advantage in picture production in that an unrealistic picture can be produced and in that a restriction on a location site or period can be reduced. Such a picture produced by combining the CG is considered to increase in the future. In the GC, it is general that a non-interlace image is handled. In Japan employing an NTSC standard, a picture of 30 frames per second is produced in consideration of affinity with a television broadcast. In the case where this image is converted into an NTSC standard television signal, such conversion is made in accordance with the 2-2 pull-down scheme.

Further, a recent video signal source includes a source in which various types of pull-down video signals coexist. A DVD is an typical example of recording such a source. The DVD includes a so-called "making picture" recollecting a pattern during cinema or video clip imaging. A scene of interview with an actor or a singer is imaged in a general video image, and scenes inserted as recollection scenes of the actor or singer are produced in 24 frames in the case of cinema imaging and in 30 frames in the case of CG. A number of video signals are edited in an arrangement in which these scenes are switched intentionally within a short period of time.

Moreover, in a DVD cinema as well, because a title indicative of the beginning of a cinema is made up of a 30-frame CG and because a 2-2 pulled-down video signal and the context of the DVD cinema have been imaged in 24 frames, there exists a DVD having recorded therein a 2-3 pulled-down video signal as well.

BRIEF SUMMARY OF THE INVENTION

According to one aspect of the present invention, there is provided a television/cinema scheme identification apparatus of a picture signal having a field frequency, by identifying a pull-down scheme when a picture source of the picture signal has been subjected to conversion processing, the identification apparatus comprising: a signal common processing section which acquires a correlation identification output obtained by identifying the presence or absence of correction of an image on a field by field basis for a plurality of continuous fields, and outputs the acquired output as a field correlation pattern; a first pull-down identifying section which compares the field collection with a first comparison pattern to acquire an identification output of a first type pull-down scheme from a result of a comparison; and a second pull-down identifying section which compares the field correlation pattern with a second comparison pattern to acquire an identification output of a second type pull-down scheme from a result of a comparison, wherein the field correlation pattern is identical in data length to the first and second comparison patterns with which the field correlation pattern is compared, and an appearance pattern of correlation identification for the first type pull-down scheme and an appearance pattern of correlation identification for the second type pull-down scheme each have a data length such that a mutually exclusive pattern relationship is established.

BRIEF DESCRIPTION OF THE SEVERAL VIEWS OF THE DRAWING

FIG. 2 is a block diagram showing a section of FIG. 1 in more detail;

FIG. 6 is a circuit diagram showing a specific example of a configuration of an inter-pull-down-scheme-type hysteresis setting section 80 in FIG. 3;

FIG. 8 is a block diagram showing a specific example of a configuration of a secondary determining section in FIG. 3;

DETAILED DESCRIPTION OF THE INVENTION

Hereinafter, some embodiments of the present invention will be described with reference to the accompanying drawings.

Figure 1:
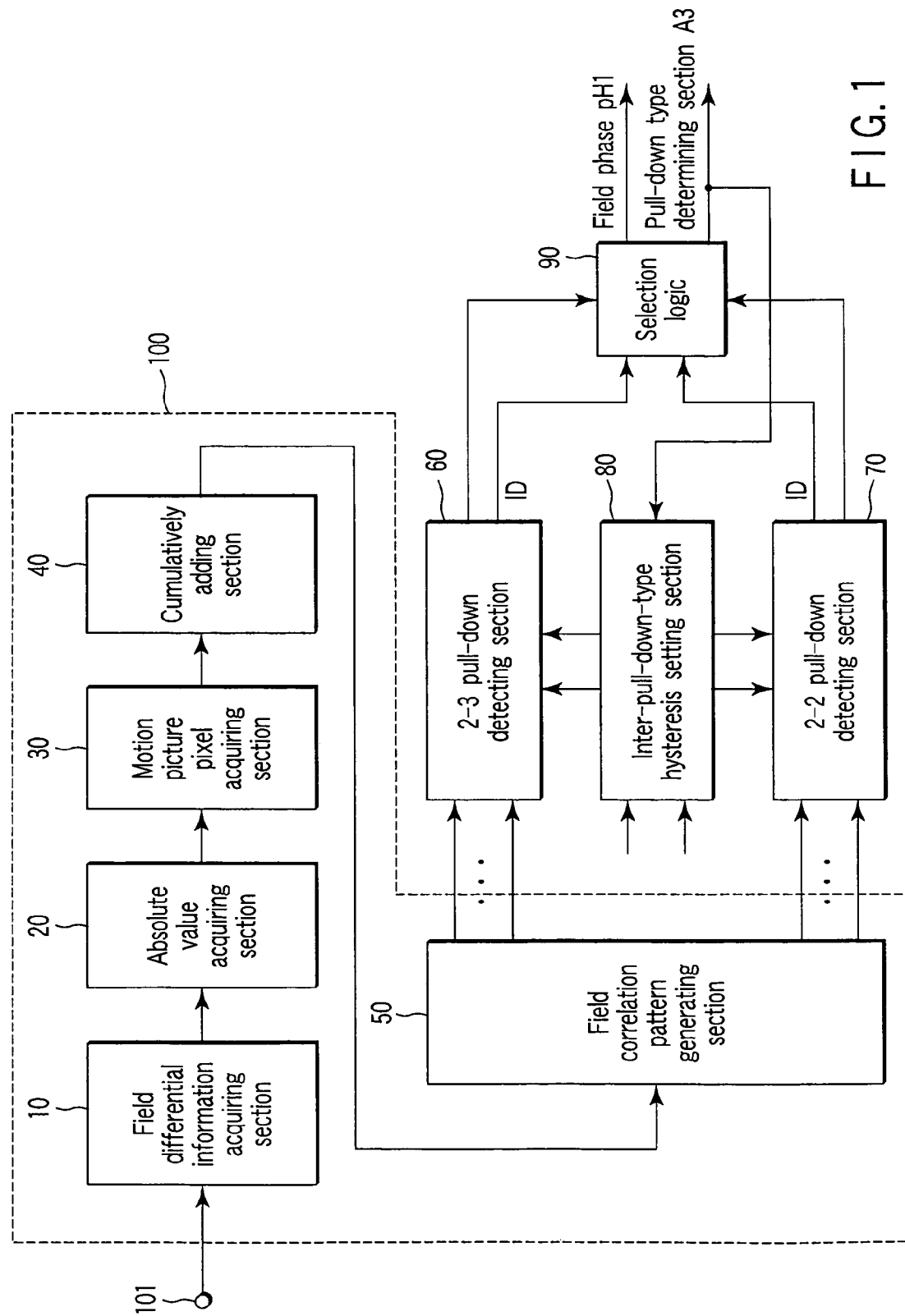
FIG. 1 is a block diagram showing one embodiment of the present invention.

FIG. 1 is a block diagram showing a configuration according to one embodiment of the present invention. The details of each block in FIG. 1 are shown, respectively, in FIGS. 2 and 3. Hereinafter, a configuration, a function, and an advantageous effect of a pulled-down picture identification apparatus according to the present embodiment will be described with reference to the figures. In the present embodiment, an input video signal to be identified may be a brightness signal or a chromatic signal. Here, a description will be given by way of typical example in which the input video signal is the brightness signal.

In the present embodiment, there exist: a signal common processing circuit for processing a 2-2 pulled-down video signal and a 2-3 pulled-down video signal; and an identification circuit of both of these signals, for identifying each of the pull-down schemes. When it is identified that whether the 2-2 pulled-down video signal is prepared in accordance with a 2-2 pull-down scheme, the video signal cannot be identified from frame differential information on a video signal, and can be identified from field differential information. In addition, in order to identify that whether the 2-3 pulled-down video signal is prepared in accordance with a 2-3 pull-down scheme, identification can be made from both of the frame differential information and field differential information.

Therefore, both identifications are made using field differential information in order to eliminate deviation of identification sensitivity between the 2-3 pulled-down video signal identification and the 2-2 pulled-down video signal identification. This advantageous effect is achieved from the fact that a majority of the circuits configuring identification devices according to the present embodiment are used in common. Namely, the apparatus of the present embodiment is featured in that a rate of a common signal processing section is large, thereby simplifying a configuration is simplified.

In FIG. 1, a brightness signal having a field frequency, the brightness signal being inputted to an input terminal 101, is inputted to a field differential information acquiring section 10. Field differential information which represents a level difference of corresponding pixels between fields, the information being acquired from the field differential information acquiring section 10, is converted into an absolute value by an absolute value acquiring section 20.

The absolute value obtained at the absolute value acquiring section 20 is inputted to a motion picture pixel acquiring section 30, and the inputted value is compared with a threshold value. The motion picture pixel information acquired from the motion picture pixel acquiring section 30 is inputted to a cumulative adding section 40. This cumulative adding section 40 accumulates motion picture pixel information for 1 field period, for example, the number of motion picture pixels. In this manner, information indicating a total number of motion picture pixels in a whole 1 field can be acquired from the cumulative adding section 40.

This information indicating a total number of motion picture pixels is inputted to a field correlation pattern generating section 50. The field correlation pattern generating section 50 is intended for generating a pattern indicating correlation of images in 2 consecutive fields. Specifically, a pattern indicating which of the respective fields is a motion picture field or a still image field is outputted.

A circuitry composed of the field differential information acquiring section 10, the absolute value acquiring section 20, the motion picture pixel acquiring section 30, the cumulative adding section 40, and the field correlation pattern generating section 50 is not provided for each type of a television/cinema scheme being identified. This circuitry is configured as a signal common processing section 100 for identifying a type of a television/cinema scheme.

A field correlation pattern is inputted to a 2-3 pull-down scheme detecting section 60 and a 2-2 pull-down scheme detection section 70, and it is detected as to which of the pull-down schemes the pattern has been inputted to. To the 2-3 pull-down scheme detecting section 60 and the 2-2 pull-down scheme detecting section 70, threshold values as described later are provided from an inter-pull-down-scheme-type hysteresis setting section 80. Therefore, since the threshold values are provided, when the other detection state is established while the sections 60, 70 enter one of the 2-3 pull-down scheme and 2-2 pull-down scheme, the other detection state is not established immediately. Thus, even if signals in accordance with different pull-down schemes are inputted to the present apparatus while they coexist, the present apparatus can make stable operation while hardly making incorrect identification.

A signal indicating a 2-3 pull-down scheme detection or non-detection state and a signal indicating a 2-2 pull-down scheme detection or non-detection state are provided to a selection logic section 90. When a signal to be inputted to the selection logic section 90 is in the 2-3 pull-down scheme non-detection or the 2-2 pull-down scheme non-detection state, the selection logic section 90 determines that a current input video signal is acquired as an image by a general video camera.

Further, phase identification (ID) information on a field correlation pattern can be acquired from the 2-3 pull-down detecting section 60 and the 2-2 pull-down detecting section 70, as described later. This ID information as well is inputted to the selection logic section 90, and is used as field phase information PHI. This field phase information PHI is utilized to specify two forward and backward fields used for interlace scanning line interpolation.

Figure 3:
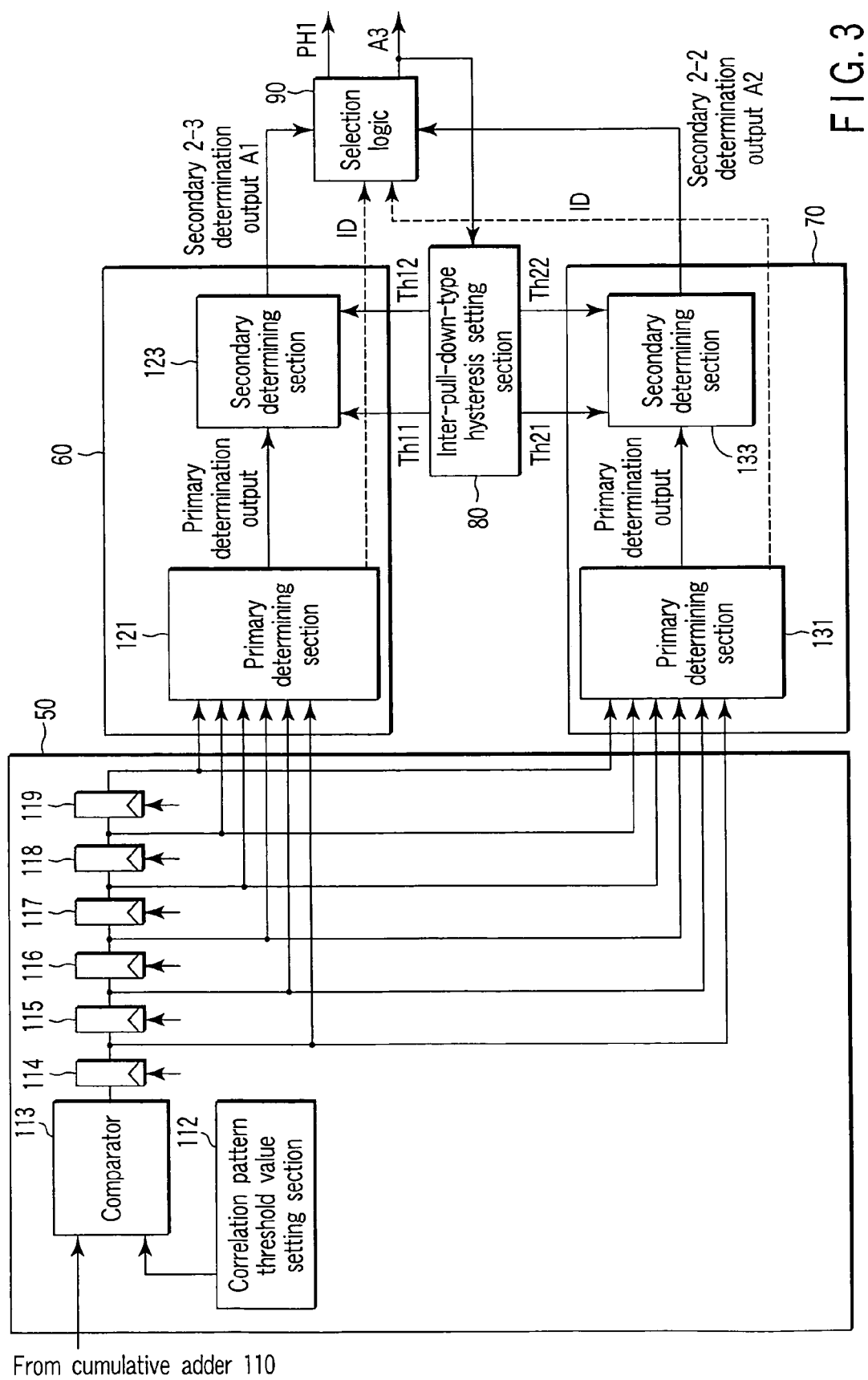
FIG. 3 is a block diagram showing a section of FIG. 1 in more detail.

FIGS. 2 and 3 show the above-described circuit blocks in more detail. A video signal (brightness signal) for 1 field supplied to the input terminal 101 is delayed for about a 1-field period by means of a field delay section 102. A brightness signal at the side of the input terminal 101 and a delayed brightness signal at an output side of the field delay section 102 are set so that the horizontal coordinate of each pixel on a screen is at an identical position. The brightness signal inputted to the input terminal 101 and the delayed brightness signal delayed by the field delay section 102 are inputted to vertical low pass filters 103 and 104, respectively. Each of the vertical low frequency brightness signals outputted from the vertical low pass filters 103 and 104 are inputted to a differentiator 105. A field differential signal is acquired from the differentiator 105. The field difference signal represents a signal level difference with respect to two corresponding pixels in the former and latter fields. Therefore, when the signal level of the former field pixel is larger than that of the latter field pixel in the case of a motion picture pixel, the resultant difference signal represents a positive value, while the former level is smaller than that of the latter level, the difference value is negative. Thus, the field difference signal should be handled as an absolute value signal.

The field differential signal acquired from the differentiator 105 is inputted to an absolute value circuit 106, and an absolute value thereof is taken. The absolute value output from the absolute value circuit 106 is supplied to one input end of a first comparator 107. From a threshold value setting section 108, an arbitrary threshold value is provided to the other input end of the first comparator 107. The threshold value and the absolute value are compared with each other, and motion picture pixel information representing whether or not an image motion occurs on a pixel by pixel basis is acquired from the first comparator 107.

The motion picture pixel information is accumulated for a 1-field period by a cumulative adder 110, and a result of this cumulative operation is produced as information indicating a total number of motion picture pixels in a 1-field period. The information indicating a total number of motion picture pixels is supplied to one input end of a second comparator 113 in FIG. 3. The information indicating a total number of motion picture pixels is compared with a correlation pattern threshold value from a threshold value setting section 112. A comparison result of the second comparator 113 is produced on 1 bit by bit basis in units of a 1-field. This comparison result is provided as a typical value representing whether each of bit data is a motion picture or a still image in each field. 1-bit data on this typical value is fed to a group of shift registers 114 to 119.

The shift registers 114 to 119 sequentially latch typical value bits inputted in units of 1 field while shifting the bits. A typical value in units of the field for at least past 6 fields is obtained as 6-bit data. Hereinafter, a time series pattern of 6 bits which is a typical value of the units of field is referred to as a field correlation pattern. A reason why a 6-bit data length for 6 fields (a pattern of a typical value) has been employed will be described later.

A field correlation pattern for 6 fields is provided to each of the 2-3 pull-down scheme detecting section 60 and the 2-2 pull-down scheme detecting section 70.

In the foregoing description, it is evident that the field correlation pattern generated from an input picture signal through the completely same process has been supplied to the 2-3 pull-down scheme detecting section 60 and the 2-2 pull-down scheme detecting section 70. As a result, it is found that the circuit construction of the present embodiment is such that no difference of sensitivity between both of the detecting schemes occurs.

Hereinafter, although passes of both of the detecting schemes are different from each other, contrivance is made such that no difference of sensitivity between both of the detecting schemes occurs, as described later. Data representing a field correlation pattern is supplied to the 2-3 pull-down scheme detecting section 60 and the 2-2 pull-down scheme detecting section 70. The 2-3 pull-down scheme detecting section 60 and the 2-2 pull-down scheme detecting section 70 both have primary and secondary 2-hierarchy identifying sections.

The 2-3 pull-down scheme detecting section 60 is composed of a primary determining section 121 and a secondary determining section 123. The 2-2 pull-down scheme detecting section 70 is composed of a primary determining section 131 and a secondary determining section 133.

First, an outline will be described here. A field correlation pattern is provided to the primary determining section 121 in the 2-3 pull-down scheme detecting section 60. The primary determining section 121 outputs "1" as a primary determining signal when the field correlation pattern coincides with a comparison pattern, and the outputted signal "1" is provided to the secondary determining section 123. To the secondary determining section 123, an introduction count threshold value (Th11) and a hold count threshold value (Th12) are provided from a hysteresis setting section 80 in addition to the primary determining signal. The secondary determining section 123 outputs "1" as a secondary determining signal (2-3 pull-down scheme determining signal) when the determination repetition count of the primary determining signal exceeds the introduction count threshold value (Th11).

With respect to the 2-2 pull-down scheme detection section 70 as well, similarly, a field correlation pattern is provided to the primary determining section 131 in the 2-2 pull-down scheme determining section 70. The primary determining section 131 outputs "1" as a primary determining signal when the field correlation pattern coincides with a comparison pattern, and the outputted signal "1" is provided to the secondary determining section 133. To the secondary determining section 133, an introduction count threshold value (Th21) and a hold count threshold value (Th22) are provided in addition to the primary determining signal. The secondary determining section 133 outputs "1" as a secondary determining signal (2-2 pull-down scheme determining signal) when the determination repetition count of the primary determining signal exceeds the introduction count threshold value (Th21). The introduction count threshold value (Th11) and hold count threshold value (Th12); and the introduction count threshold value (Th21) and hold count threshold value (Th22) are outputted from the inter-pull-down-scheme-type hysteresis setting section 80.

The selection logic section 90 receives a 2-3 pull-down scheme determining signal (A1) and a 2-2 pull-down scheme determining signal (A2), and outputs a pull-down picture type identification value (A3) from the contents of determination. In addition, this logic section 90 selects a field phase (ID) acquired from both of the detecting sections 60, 70, and outputs a pull-down scheme field phase (PH1). Note that the 2-3 pull-down scheme determining signal (A1) and the 2-2 pull-down scheme determining signal (A2) are not set to 1 at the same time. In the case where the 2-3 pull-down scheme determining signal (A1) and the 2-2 pull-down scheme determining signal (A2) are set to 0 at the same time, it can be determined that a picture signal acquired from a general video camera has been inputted.

Figure 4:
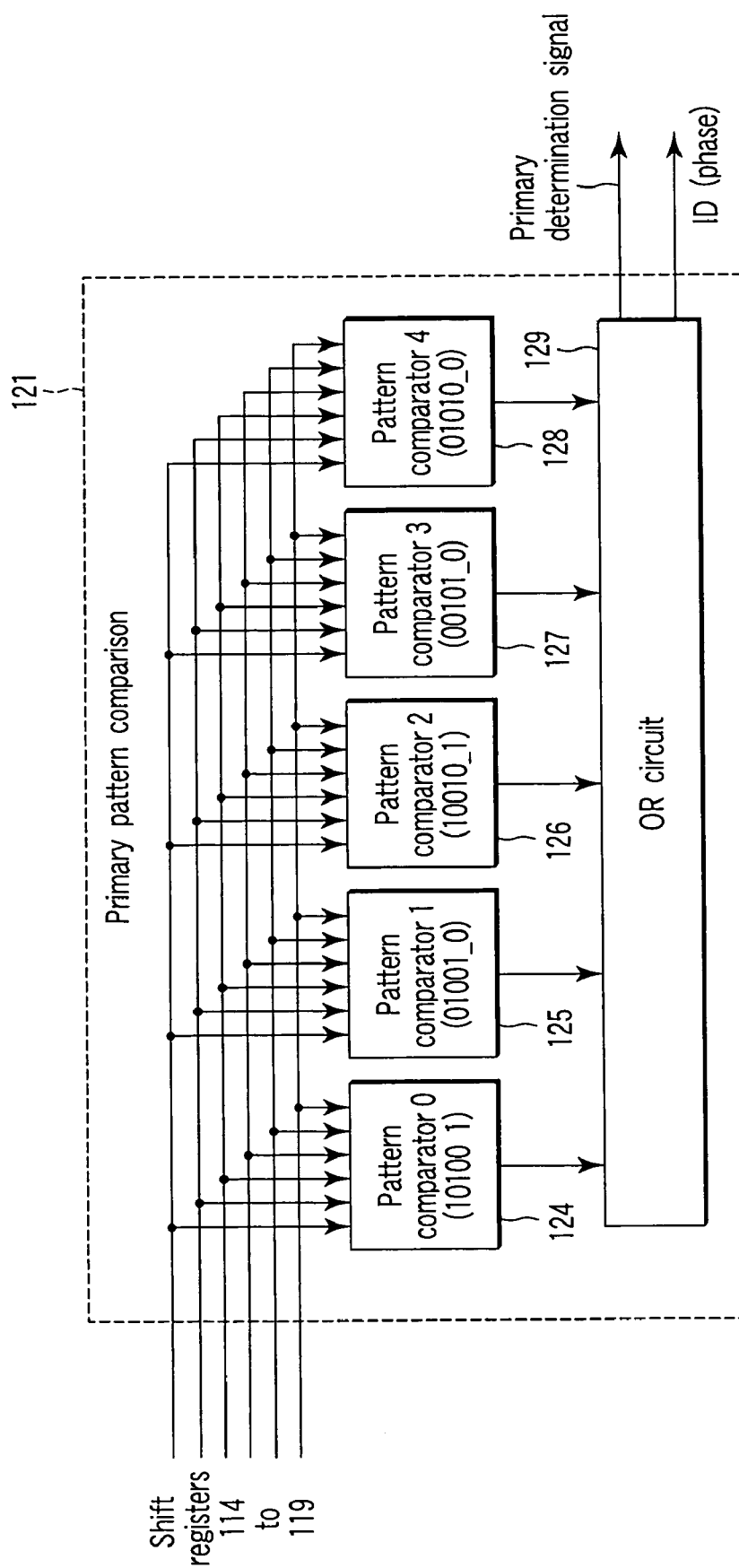
FIG. 4 is a circuit diagram showing a specific example of a configuration of a primary determining section 121 in FIG. 3.
Figure 5:
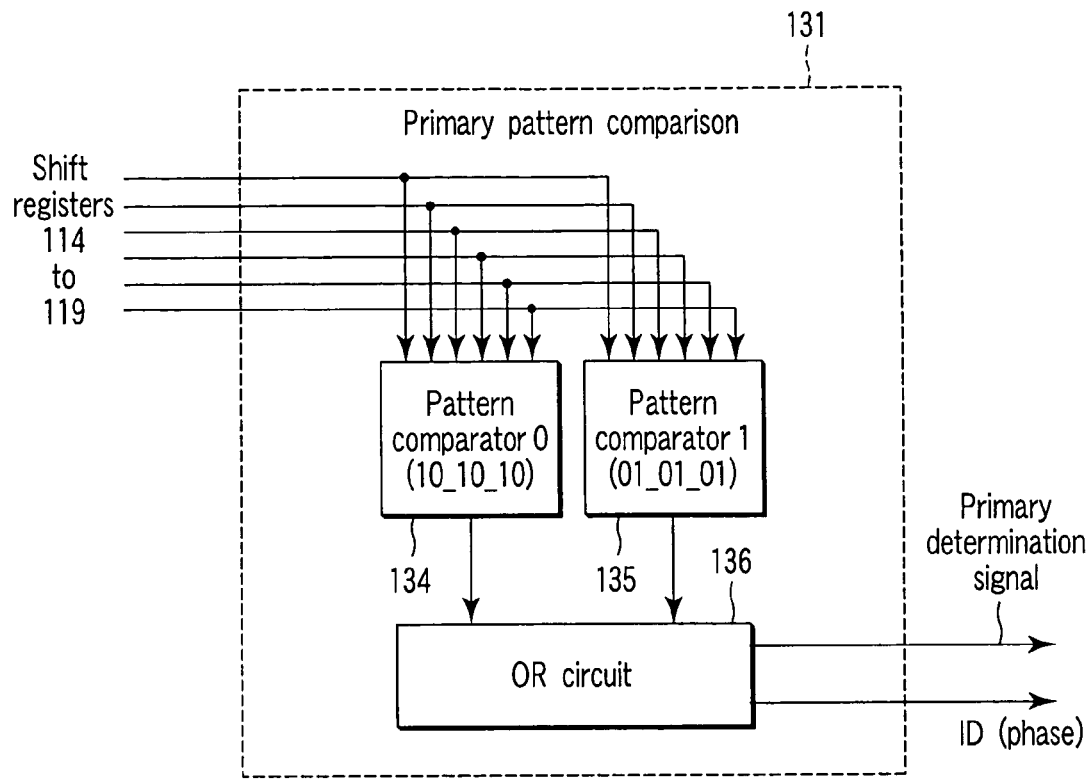
FIG. 5 is a circuit diagram showing a specific example of a configuration of a primary determining section 131 in FIG. 3.

FIG. 4 shows a detail of the primary determining section 121 in the 2-3 pull-down scheme detecting section 60, and FIG. 5 shows a detail of the primary determining section 131 in the 2-2 pull-down scheme detecting section 70.

In FIG. 4, at the primary determining section 121 in the 2-3 pull-down scheme detecting section 60, field correlation bit patterns for 6 fields are provided in parallel to 5 pattern comparators 124 to 128. Each of the pattern comparators 124 to 128 outputs "1" when an input bit pattern coincides with an incorporated comparison bit pattern, and outputs "0" when the patterns do not coincide with each other. 5 pattern comparators 124 to 128 are provided because a sequence of the 2-3 pull-down scheme is a repetition of 5 fields. Then, a comparison bit pattern incorporated in each of the pattern comparators 124 to 128 lies in a relationship in which each phase has been rotated on one by one bit phase basis such that a determination result can be obtained for each field as shown in blocks 124 to 128 in FIG. 4. Outputs from the pattern comparators 124 to 128 are provided to an OR circuit 129, whereby the determination result of each field is obtained at an output terminal of the primary determination section 121 as a primary determining signal.

Moreover, ID information indicating a phase state is outputted from the OR circuit 129. This ID information is provided as identification information indicating which of the comparison patterns incorporated in the pattern comparators 124 to 128 coincides with a field correlation pattern. This identification information represents phase information on a correlation pattern whose contents are repeated in 5 fields.

As shown in FIG. 5, at the primary determining section 131 of the 2-2 pull-down scheme detecting section 70, a field correlation pattern is provided in parallel to two pattern comparators 134 and 135. Each of the pattern comparators 134 and 135 outputs "1" when an input bit pattern coincides with an incorporated comparison bit pattern, and outputs "0" when it does not coincide. Two pattern comparators 134, 135 are provided because a sequence of the 2-2 pull-down scheme is a repetition of 2 fields. A determination result lies in a relationship in which comparison patterns incorporated in the pattern comparators 134 and 135 each have been rotated by a one by one bit phase basis so as to be acquired in each field. Outputs of the pattern comparators 134 and 135 are provided to an OR circuit 136, whereby a field based determination result (primary determining signal) can be obtained at a primary determination output at an output terminal of the primary determining section 131.

Further, ID information is outputted from the OR circuit 136. This ID information is provided as identification information indicating which of the patterns incorporated in the pattern comparators 134 and 135 coincides with the input field correlation pattern. This identification information represents phase information on a correlation pattern whose contents are repeated in 2 fields.

Here, a description will be given with respect to two contrivances such that no difference in identification or determination sensitivity occurs between determination processing in both of the circuits 121 and 131. First, a description will be given with respect to a comparison pattern incorporated in each of the pattern comparators 124 to 128 and 134 and 135. Comparison patterns at the 2-3 pull-down scheme detecting section 60 and the 2-2 pull-down scheme detecting section 70 each have 6 bits and identical pattern length (data length). In addition, there is employed a data length giving an exclusive pattern in which no coincidence absolutely occurs between the comparison patterns of both of the detecting sections 121 and 131 (the comparison pattern includes all the comparison patterns in which a phase has been rotated).

A detailed description will be given here. A field correlation pattern indicating a 2-3 pull-down video signal obtained from field differential information is produced as a repetition of "10100". A correlation pattern indicating a 2-2 pull-down video signal is produced as a repetition of "10". First, in consideration of a comparison pattern for 5 fields obtained by justifying a pattern length to a longer correlation pattern, there exists a correlation pattern which is identical to another between a 2-3 pull-down scheme sequence and a 2-2 pull-down scheme sequence. In this case, for example, a 5-bit pattern "01010" may be included in the 2-2 pull-down video signal as well as in the 2-3 pull-down video signal. Thus, a contention occurs with both of determinations, and an improper pattern (data length) is produced.

Then, assume that a pattern for 6 fields exists. As shown in FIG. 4, in the 2-3 pull-down scheme detecting section 60, a 6-bit pattern "101001" is formed, the 6-bit pattern being obtained by adding one bit "1" to a 5-bit pattern "10100" as a 2-3 pull-down scheme comparison pattern. Further, a total of 5 types of comparison patterns including "010010", "100101", "001010", and "010100" obtained by rotating that bi phase on one by one bit basis are provided in parallel to the comparators 124 to 128.

On the other hand, the 2-2 pull-down scheme detecting section 70, as shown in FIG. 5, determines a total of two types of comparison patterns including a 6-bit comparison pattern "101010" of the 2-2 pull-down scheme and a pattern "010101" obtained by rotating that phase by 1 bit by providing the comparators 134 and 135 in parallel.

These comparison patterns are provided as exclusive patterns in which no coincidence absolutely occurs between the 2-3 pull-down scheme and the 2-2 pull-down scheme. Thus, no contention occurs between 2-3 pull-down scheme determination and 2-2 pull-down scheme determination.

A second contrivance is that a field based determination result is obtained at the 2-3 pull-down scheme detecting section 60 and the 2-2 pull-down scheme detecting section 70, as described previously.

The field based determination means that a determination interval to be determined per unit time is equal to each other between both of the determinations, and inevitably, there is provided a structure in which no difference in sensitivity between both of the determinations occurs.

The description of the characterizing contrivances in the primary determination has now been completed. Therefore, no incorrect determination occurs when a field correlation pattern of a video signal in an ideal 2-3 pull-down scheme or 2-2 pull-down scheme is provided to the 2-3 pull-down scheme detecting section 60 and the 2-2 pull-down scheme detecting section 70.

However, there is a need for consideration of a picture because a field correlation pattern changes depending on the content of an image of an input video signal, i.e., a picture. Further, there is a need for further contrivance because it is impossible to eliminate incorrect identification at the primary determining section with respect to a field correlation pattern based on an image which easily induces incorrect identification of a picture source.

A consideration of these matters will be described here. First, with attention being paid to a generation frequency of a field correlation pattern with respect to a true pulled-down video signal and a correlation pattern which induces incorrect determination, a hysteresis is provided for the purpose of identification of the true field correlation pattern with respect to a pulled-down video signal.

FIG. 6 shows a specific example of a configuration of the inter-pull-down-scheme-type hysteresis setting section 80. This figure shows how threshold value setting is provided. The pull-down scheme type determination value (A3) is fed back from the logic section 90 in FIG. 1, and is supplied to a decoder 147. From the decoder 147, a value representing whether an immediately preceding determination value is in accordance with the 2-3 pull-down scheme or 2-2 pull-down scheme is outputted.

This output is supplied to selectors 143, 144, 145, and 146 to determine the introduction count threshold value (Th11) for the 2-3 pull-down scheme and the hold count threshold value (Th12) for the 2-3 pull-down scheme; and the introduction count threshold value (Th21) for the 2-2 pull-down scheme and the hold count threshold value (Th22) for the 2-2 pull-down scheme.

That is, in the case where the immediately preceding pull-down scheme type determination value is set at the side of the 2-3 pull-down scheme, "0" is outputted from the decoder 147, and an introduction count threshold value (L1) which can be arbitrary set can be selected for the introduction count threshold value (Th11) for the 2-3 pull-down scheme. A hold count threshold value (L2) which can be arbitrarily set is selected for the hold threshold value (Th12) for the 2-3 pull-down scheme. A maximum value of a bit width thereof is selected as the introduction count threshold value (Th21) for the 2-2 pull-down scheme.

A minimum value 0 is selected as the hold count threshold value (Th22) for the 2-2 pull-down scheme.

In the case where the immediately preceding pull-down scheme type determination value is set at the 2-2 pull-down scheme side, the above setting is reversed. Namely, "1" is outputted from the decoder 147, and the introduction count threshold value (L1) which can be arbitrarily set is selected as the introduction count threshold value (Th21) for the 2-2 pull-down scheme. The hold count threshold value (L2) which can be arbitrarily set is selected as the hold count threshold value (Th22) for the 2-2 pull-down scheme. A maximum value of a bit width thereof is selected as the introduction count threshold value (Th11) for the 2-3 pull-down scheme. A minimum value 0 is selected as the hold count threshold value (Th12) for the 2-3 pull-down scheme.

The above-described hysteresis setting section 80 operates together with the secondary determining sections 123, 133 in FIG. 3. That is, in the case where the immediately preceding pull-down scheme determination value is set at the 2-3 pull-down scheme side, a hysteresis is set so as to easily determine and hold the 2-3 pull-down scheme and so as to hardly determine the 2-2 pull-down scheme and easily exit from the 2-2 pull-down scheme determination. On the contrary, in the case where the immediately preceding pull-down scheme determination is set at the 2-2 pull-down scheme side, the above setting is reversed.

Figure 7:
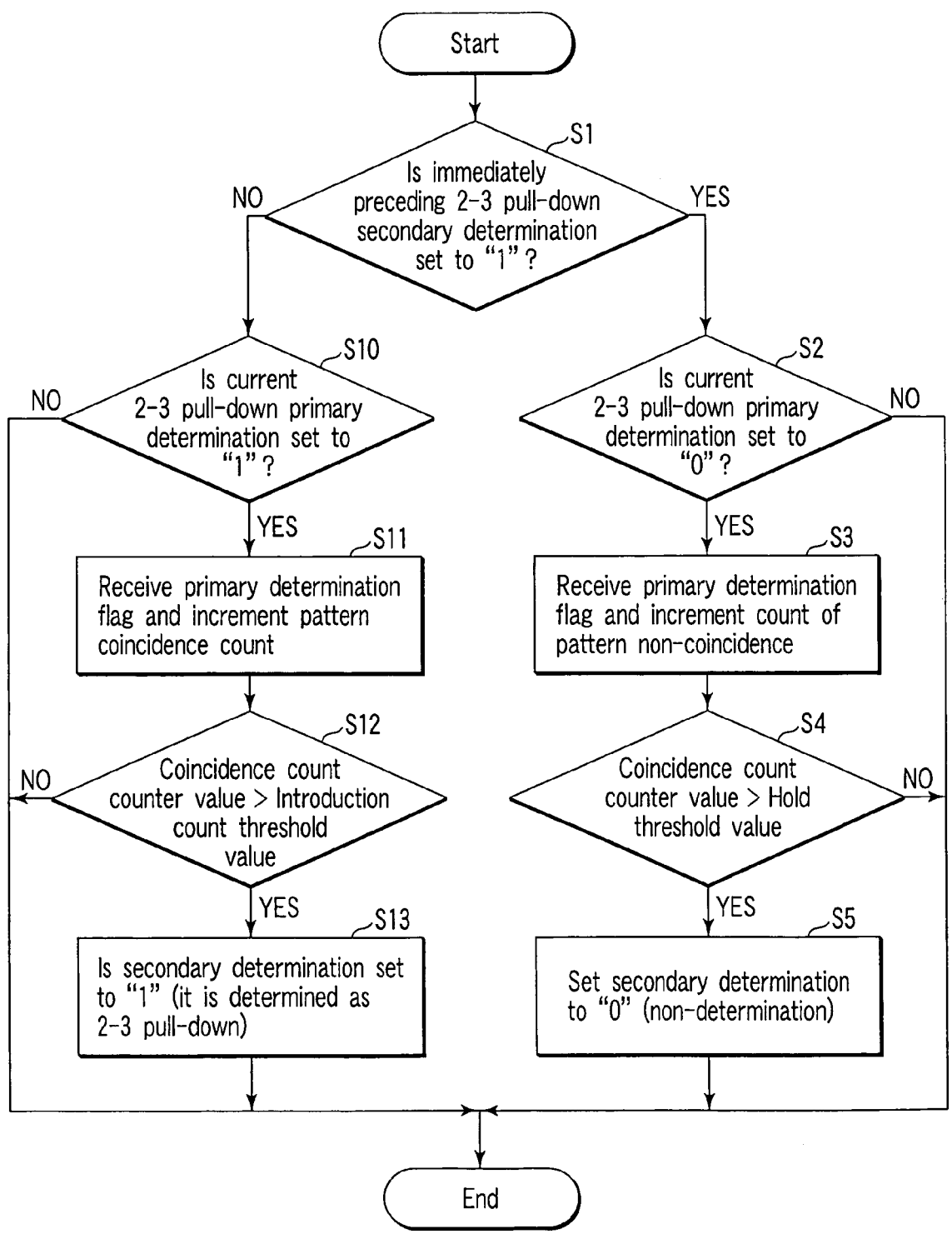
FIG. 7 is a flow chart showing an operation of a secondary determining section 123 in FIG. 3 for the purpose of illustration.

FIG. 7 is a flow chart showing an operation on a field by field basis, of the secondary determining section 123 in the 2-3 pull-down detecting section 60 having received the above-described threshold value. A logic operation is branched away according to whether or not secondary determination of the immediately preceding 2-3 pull-down scheme is "1".

In the case where secondary determination in the immediately preceding 2-3 pull-down scheme is "1" (namely, in the case where the 2-3 pull-down scheme determination state is established), an operation for providing holding hysteresis is made. Then, it is determined whether or not the primary determination of the current 2-3 pull-down scheme is "0" (namely, in the case where the 2-3 pull-down scheme non-determination state is established) (steps S1 and S2). Here, if the primary determination of the current 2-3 pull-down scheme is "1", it means that the immediately preceding pull-down scheme is not changed, and processing terminates. In contrast, if the primary determination of the current 2-3 pull-down scheme is "0", it means that there is a possibility of release from the 2-3 pull-down determination. At this time, processing goes to step S3 in which a primary determination flag is received, and the pattern non-coincidence count is incremented. Next, processing goes to step S4 in which it is determined whether or not the non-coincidence count exceeds a hold count threshold value. When the hold count threshold value is not exceeded, a value of the non-coincidence count is held, processing temporarily terminates, and processing reverts to a start state. When the non-coincidence count exceeds the threshold value in step S4, it means that there is a high possibility that the 2-3 pull-down is not established, and a secondary determination output is changed to "0" and the 2-3 pull-down scheme determination state is released.

In step S1, in the case where the secondary determination of the immediately preceding 2-3 pull-down scheme is "0" (namely, in the case where the 2-3 pull-down is not established), processing goes to step S10 in order to make an operation for providing introduction hysteresis. Here, it is determined whether or not the primary determination of the current 2-3 hysteresis scheme is "1". In the case where the primary determination of the current 2-3 pull-down scheme is not "1", the 2-3 pull down state is not established, and thus, processing terminates. However, in the case where the primary determination of the current 2-3 pull-down scheme is set to "1", there is a possibility that the 2-3 pull-down scheme determination is established.

At this time, processing goes to step S11 in which a primary determination flag is received, and the pattern coincidence count is incremented. Next, processing goes to step S12 in which it is determined whether or not the coincidence count exceeds the introduction count threshold value. When the introduction count threshold count is not exceeded, a value of the coincidence count is held, processing terminates, and a start state is established again. When the coincidence count exceeds the threshold value in step S12, it means that there is a high possibility that the 2-3 pull-down scheme is established, and a secondary determination output is changed to "1" (a lead-in state for the 2-3 pull-down scheme determination).

Therefore, by adjusting the above hold count threshold value to be increased and the introduction count threshold value to be decreased, in the case where the immediately preceding pull-down scheme determination value is set at the 2-3 pull-down scheme side, hysteresis can be set such that the 2-3 pull-down scheme is easily determined and held.

When the secondary determining section 123 is composed of, for example, a microprocessor, programming of this microprocessor is carried out in accordance with the flow chart shown in FIG. 7.

Further, the secondary determining section 123 can be configured by using concrete circuits such as a counter and a flip flop circuit. FIG. 8 is a block diagram showing an example of this configuration. In FIG. 8, the primary 2-3 pull-down determination value "1" or "0" outputted from the primary determining section 121 is supplied to a buffer 153 and also supplied to input terminals of logical gates 151 and 152 provided in the secondary determining section 123. As the other input of the logical gates 151 and 152, an output of an SR flip flop circuit 154 is supplied via a transfer gate 155 controlled by a field period signal, i.e., a clock. An output from this transfer gate 155 is provided as an output "1" or "0" which is a secondary 2-3 pull-down determination value from the secondary determining section 123, and is fed back to a buffer 156 as well.

Outputs of the logical gates 151 and 152 are supplied as increment control signals to counters 157 and 158, respectively. Outputs of the buffers 153 and 156 are supplied as reset signals to these counters 157 and 158. The output of the counter 157 is supplied as a 2-3 pull-down coincidence count to a comparator circuit 159, and the supplied output is compared with the introduction count threshold value from the hysteresis setting section 80. The output of the counter 158 is supplied as a 2-3 pull-down non-coincidence count to a comparator circuit 160, and the supplied output is compared with a hold threshold value from the hysteresis setting section 80. The counters 157 and 158 are operated by the clock of the field period. An output of the comparator circuit 159 is supplied to a set terminal S of the SR flip flop circuit 154, and an output of the comparator circuit 160 is supplied to a reset terminal R of the SR flip flop circuit 154.

Hereinafter, a description of operation of the secondary determining section 123 in FIG. 8 will be given. First, assume that a primary 2-3 pull-down determination value is set to "1", a gate of the logical gate 151 is opened, and a gate of the logical gate 152 is closed. In addition, assume that an immediately preceding secondary 2-3 pull-down determination value is set to "1". Therefore, the SR flip flop circuit 154 is established at a set state, and a set output "1" is provided from a Q terminal of this flip flop circuit 154.

In this state, since the primary 2-3 pull determination value is set to "1", the counter 158 is reset via the buffer 153. On the other hand, the counter 157 is incremented by means of the increment control signal from the logical gate 151, the coincidence count supplied to the comparator circuit 159 increases, and an input is provided to the S terminal of the SR flip flop circuit 154. However, this flip flop circuit 154 has been already set at a set state; the current determination value is equal to the immediately preceding determination value, and an output determination value of the circuit 123 does not change.

If the primary 2-3 pull-down determination value is set to "0", the logical gate 151 is closed, and the logical gate 152 is opened. Then, the counter 158 is incremented, and the incremented 2-3 pull-down non-coincidence count threshold value is supplied to the comparator circuit 160. Since a hold count threshold value is supplied to the comparator circuit 160, the SR flip flop circuit 154 is not reset until the non-coincidence count has exceeded this hold count threshold value. Then, the 2-3 pull-down secondary determination value is not changed immediately, and hysteresis is provided to the contents of determination of the circuit 123.

When the primary 2-3 pull-down determination value continuously counts "0" in plurality, and if the count value of the counter 158 exceeds a hold count threshold value, a reset output from the comparator circuit 160 is supplied to the SR flip flop circuit 154. Then, a 2-3 pull-down secondary determination value which is an output of the transfer gate 155 is set to "0". In this manner, the counter 157 is reset. At this time, there is a high possibility that the 2-3 pull-down scheme is not established.

In this state, if the primary 2-3 pull-down determination value is set to "1", the counter 158 is reset, and then, the count value of the counter 157 is incremented. Although this count value is provided to the comparator circuit 159, the introduction count threshold value is provided to this comparator circuit 159, and thus, the SR flip flop circuit 154 is not set immediately.

If a state in which the primary 2-3 pull-down determination value is set to "1" is continuously supplied in excess of the introduction count threshold value, there is a high possibility that the 2-3 pull-down scheme is established. Thus, the SR flip flop 154 is set by the output of the comparator circuit 159, and the 2-3 pull-down secondary determination value "1" is outputted.

In the similar manner, the secondary determining section 133 in the 2-2 pull-down detecting section 70 can be composed of a microprocessor programmed so as to make an operation as shown in the flow chart of FIG. 7, similarly, or alternatively, can be achieved by a circuit which is similar to that of FIG. 8. These operations on a field by field basis are such that the above-described 2-3 pull-down scheme is read as a 2-2 pull-down scheme. Similarly, when the preceding pull-down scheme determination value is set at the 2-2 pull-down scheme side, hysteresis can be set such that the 2-2 pull-down scheme is easily determined and held.

Since an incorrect determination inducing picture pattern is not frequently generated, the introduction count threshold value is not reached in general. Therefore, a determination result of a secondary determination is not affected. In addition, for example, assume that a chapter of picture data changes during DVD reproduction in such a manner that a 2-3 pull-down picture is produced in a previous chapter and a 2-2 pull-down picture is produced in a current chapter. In this case, although the current 2-2 pull-down picture is hardly determined due to the previous 2-3 pull-down determination, a 2-2 pull-down picture pattern which is a true pull-down picture pattern in a DVD is frequently generated. Thus, the 2-2 pull-down scheme determination is made in excess of a threshold value. Subsequently, an operation is made so as to maintain the 2-2 pull-down scheme determination.

Further, since a field correlation pattern depends on contents of a picture, an ideal pattern is not always obtained. Thus, a case in which a momentary determination shift occurs. If this determination shift occurs within an allowable period, a determination state is held by a hold hysteresis, the frequent switching of pull-down scheme identification is prevented, and a stable determining operation is obtained. Of course, since excessive state holding cannot follow an edit point or the like at which the shift of a picture scheme may occur, a proper value should be set.

As described above, in the apparatus of the present embodiment, two types of hysteresis are provided as hysteresis of a pull-down determining section. The primary determining section 121 in the 2-3 (first type) pull-down scheme compares a field correlation pattern with a comparison pattern of the 2-3 (first type) pull-down scheme, and obtains a primary determination output on a field by field basis. The secondary determining section 123 uses a primary determination output from the primary determining section as an input. This determining section has an introduction hysteresis as a feature for response to the input and has a hold hysteresis as an output feature for changing an output hold state. The primary determining section 131 in the 2-2 (second type) pull-down scheme similarly compares a field correlation pattern with a comparison pattern in the second type pull-down scheme, and obtains a primary determination output on a field by field basis. The secondary determining section 133 uses the primary determination output from the primary determining section as an input. This determining section has an introduction hysteresis as a response feature with respect to the input and has a hold hysteresis as an output feature for changing an output hold state. The introduction hysteresis in each of the secondary determining section in the first type pull-down scheme and the secondary determining section in the second type pull-down scheme easily responds to a determination input which is the same as a current determination output, and hardly responds to a determination input which is different from the current determination output. The hold hysteresis is set to easily hold a current determination output (and to hardly respond to switch to an output which is different from the current determination output).

Figure 11:
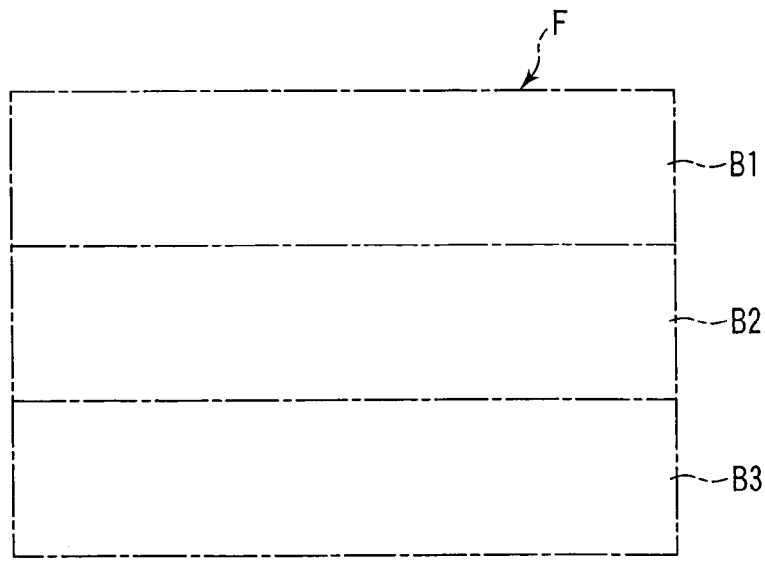
FIG. 11 is a diagram showing a state in which a field image has been divided into blocks in another embodiment of the present invention.

In the present embodiment, although a cumulatively added value of the number of motion picture pixels has been obtained in units of a 1-field screen, of course, it is possible to divide a screen into some blocks and make a television/cinema scheme identification by obtaining a cumulatively added value of the number of motion picture pixels on a block by block basis. For example, as shown in FIG. 11, one field screen F is divided into three blocks B1, B2, and B3 in a vertical direction, and a cumulatively added value of motion picture pixels is obtained on a block by block basis, thereby carrying out television/cinema scheme identification. In this case, a block correlation pattern generating section is used instead of the field correlation pattern generating section 50 of FIG. 1. In this case, the configuration is identical to that of FIG. 1 except that a block is defined in units of a correlation pattern generation instead of a field.

In this case, a correlation pattern on a block by block basis is obtained. Therefore, correlation determination outputs to a plurality of blocks can be sequentially obtained within a 1-field period. The pull-down type determination values are obtained with respect to individual block regions. This pull-down type determination value is utilized as specification information for interlace scanning line interpolation with respect to the individual block regions (information indicating whether to use a scanning line former 1 field or whether to use a scanning line latter 1 field as information for a scanning line interpolation of an intermediate field of three continuous fields). In 1 field, a determination value indicating the 2-3 pull-down scheme may be obtained with respect to a certain block, and a determination value indicating a general video signal or a determination value indicating the 2-2 pull-down scheme may be obtained with respect to another block. However, there is no problem even if such a determination result is obtained. For example, assume that a news flash television program has been inserted during cinema broadcasting. A background cinema source is a picture in the 2-3 pull-down scheme produced from a 24-frame film, and the news flash television program is in accordance with a general video scheme or 2-2 pull-down scheme irrelevant to the background. The above-described determining operation is valid with respect to a video signal edited while these scenes coexist on 1 screen.

According to the above-described embodiment, there can be provided:

1) a television/cinema scheme identification apparatus in which a ratio of a common signal processing section is large with respect to a plurality of signals to which different types of pull-down schemes are applied, respectively, and a configuration is simple; and 2) a television/cinema scheme identification apparatus with a high detection capability with respect to signals in different types of pull-down schemes;

3) a television/cinema scheme identification apparatus free of a deviation of detection sensitivity with respect to signals in different types of pull-down schemes; and 4) a television/cinema scheme identification apparatus in which, even if signals in different types of pull-down schemes are inputted while they coexist, incorrect determination is hardly made, and a stable operation can be achieved.

Now, another embodiment of the present invention will be described here. An object of the present embodiment is to operate pull-down scheme determination with higher precision, speediness, and stability in addition to the features of the first embodiment. In the present embodiment, attention is paid to the fact that a rate of a motion picture region of an input picture differs depending on contents of a picture. In the present embodiment, there is provided means capable of precisely making television/cinema scheme identification even for a picture with a plenty of still picture scenes such as a natural picture.

A difference from the embodiment of FIG. 1 is that automatic gain variable means is provided in the circuit for obtaining a field correction pattern.

In the first embodiment, binary signals representing a field correlation pattern has been obtained in order to make television/cinema scheme identification. The field correlation pattern is obtained as a result of comparison between the number of motion picture pixels in a 1-field period and a threshold value. The number of motion picture pixels in a 1-field period depends on a rate of a motion picture region in 1 screen. The number of motion picture pixels in a 1-field period is not valid in value itself, and is valid in time series pattern of the picture pixels. Thus, if a picture is a motion picture, a pixel pattern with respect to a motion picture is obtained, and if a picture is a still image, a pixel pattern with respect to the still image is obtained, whereby picture regularity can be obtained in more detail.

Figure 9:
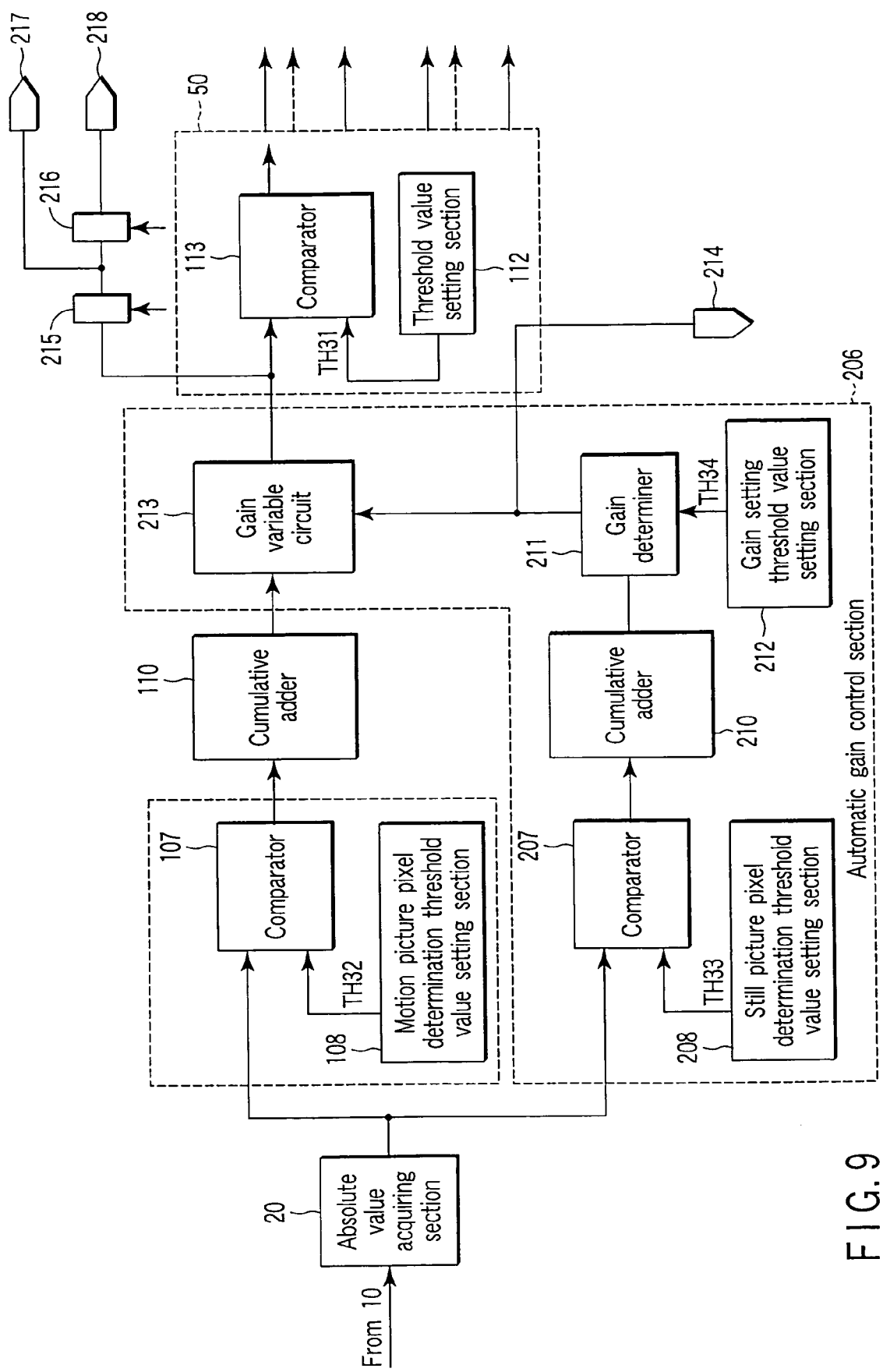
FIG. 9 is a block diagram showing a still another embodiment of the present invention.

FIG. 9 shows a second embodiment of the present invention. A difference from the first embodiment shown in FIG. 1 is that there is provided automatic gain control section 206 which is provided between the absolute value acquiring section 20 and the field correlation pattern generating section 50 shown in FIG. 1. The other constituent elements are identical to those of FIG. 1, and thus, FIG. 9 shows only constituent elements which are different from those of FIG. 1.

A description will be given with reference to FIG. 9. A field differential absolute value can be obtained by means of the absolute value acquiring section 20. As has been described in the first embodiment, this field differential absolute value is inputted to a circuit comprising the comparator 107 and the cumulatively adding section 110. The cumulatively adding section 110 counts the number of motion picture pixels in 1 field.

On the other hand, the field differential absolute value is inputted to one end of a comparator 207 which configures the automatic gain control section 206. This comparator 207 compares an absolute value with a still picture pixel determination threshold value from a threshold value setting section 208. The comparator 207 obtains a logical value "1" when the absolute value is small. This value is defined as still picture pixel data. This still picture pixel data is inputted to a cumulative adder 210. The cumulative adder 210 computes the number of still image picture pixels in 1 field.

The number of still picture pixels and a gain set threshold value are compared with each other, and a gain variable is determined depending on whether or not the number of still image picture pixels are large or small. A comparison result is provided to a gain variable circuit 213. This comparison result can be monitored at a monitor terminal 214 to which a monitor (not shown) is connected.

The comparison result may be binary data which represents a relationship of whether or not the result is larger or smaller than a threshold value. Alternatively, the comparison result may be ternary data which represents one of the following:

(1) the result is smaller than a threshold value;

(2) the result is larger than the threshold value, and is smaller than twice of the threshold value; and (3) the result is larger than twice of the threshold.

Further, the comparison result may be denoted any values representing a relation with respect to a plurality of threshold values.

The gain variable circuit 213 converts the number of field motion picture pixels from the cumulative adder 110 into the number of corrected motion picture pixels according to the comparison result. When it is determined that the number of still picture pixels is small based on the comparison result of a gain determiner 211, the number of field motion picture pixels is converted into the number of corrected motion picture pixels by multiplying the number of the pixels by 1. When it is determined that the number of still picture pixels is increased more based on the comparison result, the determination data is converted into the number of corrected motion picture pixels with its increased multiplying factor for increasing the corrected number of field motion picture pixels.

In this manner, even if a rate of the motion picture pixel region in a picture is small, it functions to enhance the presence of the motion picture pixels in the screen, and the number of corrected motion picture pixels can be obtained. Namely, in the prior art, as long as a certain degree of motion picture scenes is provided, television/cinema scheme identification can be made. However, in the present embodiment, the presence of the motion picture pixels are enhanced even if an area of the motion picture pixels is small, and thus, television/cinema scheme identification can be made speedily. In other words, the motion picture detection sensitivity is controlled according to a state of a still picture. In this way, the present embodiment is featured in that a gain of a cumulatively added value of a motion picture pixel determination output is controlled according to a rate occupied by a still picture in a 1-field period.

The number of corrected motion picture pixels is compared with a correlation pattern threshold by means of the comparator 113, and a binary signal representing the field correlation pattern is obtained. Subsequent operations are omitted here because they are identical to those of the first embodiment.

In addition, the number of corrected motion picture pixels is shifted on a one by one field basis by means of shift registers 215 and 216, and time series data is monitored by monitors connected to the monitor terminals 217 and 218 for the number of corrected motion picture pixels at the same time. If a pulled-down picture input occurs, "correlation" and "no correlation" are repeated in a specified period in time series. Thus, it is expected that a large numeric value and a small numeric value are repeated.

Next, a threshold value Th31 from the threshold value setting section 112 with respect to the comparator 113 is known because it is arbitrarily provided. If other threshold values Th32, Th33, and Th34 are adjusted as if values at the monitor terminals 217 and 218 for the number of corrected motion picture pixels sandwiches the threshold value Th31, adjustment can be made speedily. These threshold values can be adjusted from the outside of an IC chip provided that the circuit of the present embodiment is manufactured as the IC chip.

After inputting a picture signal with many motion picture scene or with many still picture scene, while monitoring at the comparison result monitor terminal 214 described previously, if the threshold values Th32, Th33, Th34, and Th31 are adjusted, adjustment can be made easily for a picture with a variety of rates of motion picture regions. This means that an operator's work of adjustment is facilitated after manufacturing, adjustment is made within a short period of time, and a product price can be efficiently reduced.

Even when an ideal 2-3 pulled-down picture is inputted, it is, of course, expected that values appearing at the monitor terminals 217 and 218 for the number of corrected motion picture pixels are lower than the threshold value Th31 because of a 5-field sequence. However, this case is low in probability because it is only once per 5 fields, and only 2 terminals will suffice.

The method for reducing an adjustment period of a picture device has been additionally described above. This method reduces adjustment cost and period. In the present embodiment, the number of still picture pixels has been counted in order to obtain a rate of a motion picture region in a picture screen. An advantage of this scheme will be described here.

First, the threshold value Th32 for motion picture pixel determination and the threshold value Th33 for still picture pixel determination are independent of each other. Thus, a non-sensitive zone can be provided between these thresholds, whereby incorrect operation caused by noise can be prevented, and television/cinema scheme identification can be precisely made. Next, some cinema based pictures (for example, a vista size) are transmitted by adding no-picture sections on the top and bottom of a screen. In the present embodiment, there is no need for specifically measuring a region of the no-picture sections in order to obtain a substantial efficient region on a screen. This is because the top and bottom no-picture sections are generally a black still picture, and thus, is measured in the same manner as in another still picture region. Therefore, a top and bottom no-picture section region determination circuit is eliminated, and an increase of a circuit resource can be restrained.

As has been described above in detail, in the present embodiment, a precise, speedy, and stable television/cinema scheme identification feature can be obtained for a picture with many still picture scenes as well as a picture with many motion picture scenes irrespective of a rate of a motion picture section of a picture. In addition, in the present embodiment as well, although a cumulatively added value has been obtained in units of 1 screen, it is, of course, possible to divide a screen into some blocks, obtain a cumulative added value on a block by block basis, make automatic gain control, and make television/cinema scheme identification.

Further, in the present embodiment, although the number of corrected motion picture pixels has been obtained after the number of motion picture pixels has been dynamically gain-converted, it is, of course, possible to provide a configuration for dynamically changing a correlation pattern threshold value prepared for the comparison.

Figure 10:
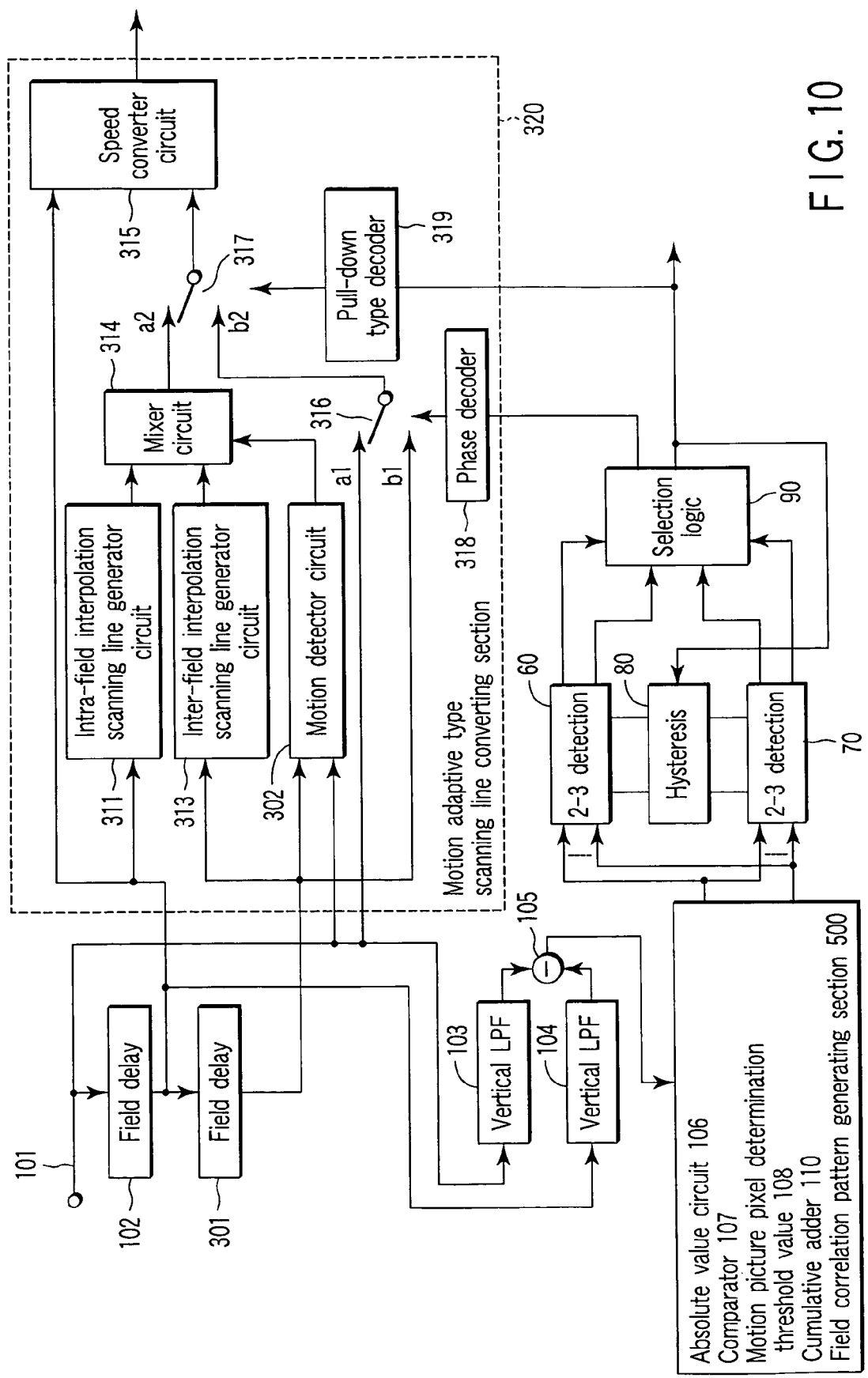
FIG. 10 is a diagram showing a signal processing section having a scanning line conversion mechanism to which the present invention is applied.

FIG. 10 shows a relationship between a motion picture adaptive type scanning line converting section 320 and a pull-down scheme determination output. Like elements indicated by the figures shown above are designated by like reference numerals.

A motion detector circuit 302 is provided in a motion picture adaptive type scanning line converting section 320. The motion detector circuit 302 detects an image motion. The motion detector circuit 302 utilizes an input side signal of the field delay section 102 and an output side signal of a field delay section 301 for further delaying an output of the field delay section 102 by 1 field as input video signals. An output of the field delay section 102 is inputted to an intra-field interpolation scanning line generator circuit 311. An output of the field delay section 301 is inputted to an inter-field interpolation scanning line generator circuit 313. The intra-field interpolation scanning line generator circuit 311 and the inter-field interpolation scanning line generator circuit 313 each is provided as a circuit for generating a scanning line for interpolation. The intra-field interpolation scanning line generator circuit 311 generates a scanning line for interpolation by using above and lower scanning lines with respect to an interest scanning line in the same field. On the other hand, the inter-field interpolation scanning line generator circuit 313 generates a scanning line for interpolation by using a corresponding scanning line of a preceding field.

Outputs of the intra-field interpolation scanning line generator circuit 311 and the inter-field interpolation scanning line generator circuit 313 are mixed while a mixing rate is controlled according to the magnitude of a motion detecting signal from the motion detector circuit 302 in a mixer circuit 314. In a motion picture region, a mixing rate of the output of the intra-field interpolation scanning line generator circuit 313 increases. In a still picture region, a mixing rate of the output of the inter-field interpolation scanning line generator circuit 313 increases. An output of the mixer circuit 314 is inputted to a speed converter circuit 315. The speed converter circuit 315 sets horizontal scanning frequencies of a signal of the output of the field delay section 102 and a signal from the mixer circuit 314 twice, both of the resultant signals are interleaved, and a progressive video signal is generated and outputted.

Here, when a 2-3 pull-down scheme or 2-2 pull-down scheme signal is inputted, a signal from the field delay section 102 and a signal passing through switches 316 and 317 are inputted to the speed converter circuit 315.

In this case, a pull-down type decoder circuit 319 changes the switch 317 to a b2 position. The switch 316 is controlled by means of a phase decoder circuit 318, and is switched to an a1 or b1 position. Namely, the phase decoder circuit 318 outputs specified information for scanning line interpolation. Thus, information indicating use of a scanning line before 1 field (b1 position) or a scanning line after 1 field (a1 position) is outputted for interpolation of a scanning line of a center field of three continuous fields. This indicating information controls the switch 316 so as to be adopted to combine signals of the 2-3 pull-down scheme and combine signals of the 2-2 pull-down scheme, respectively.

As described above, the embodiments of the present invention are practical, achieve a variety of advantageous effects, and have their characterizing points below.

1) A field correlation pattern is obtained from a field differential, and pull-down scheme determination is made. 2-2 pull-down scheme determination must be obtained from the field differential because the two fields having the same contents do not overlap to be distant by 1 frame in principle. On the other hand, 2-3 pull-down scheme determination is also obtained from a field differential and a frame differential. Thus, in the present invention, there is provided a configuration in which the determination is obtained from the field differential, a majority circuitry of detecting schemes can be used in common, and precise determination can be made without producing deviation in sensitivity of both determinations.

In addition, hysteresis is provided between both of the pull-down scheme determination systems, whereby type of a picture element (2-3 or 2-2 pulled-down picture or general video picture) can be identified reliably, speedily, and stably. An automatic gain control mechanism is provided for extraction of a correlation pattern on a field by field basis, whereby television/cinema scheme identification is stably made at a proper sensitivity irrespective of a rate of a motion picture region of an image of a picture.

2) Exclusive patterns are selected between detection for comparison patterns and field correlation patterns. A motion picture and a still picture are expressed to be binary number 1 and 0 in a field correlation pattern, a 2-3 pulled-down picture is a 5-field sequence, and thus, a determination pattern is "10100". On the other hand, since a determination pattern of a 2-2 pulled-down picture is a 2-field sequence, the pattern is "10", for example. However, in a pattern of the 2-3 pulled-down picture as well, "10" is included. Thus, a pattern having a length for an exclusive pattern to be generated is employed as a comparison pattern, and both determinations occurs exclusively, thereby prevent incorrect determination. Namely, since comparison patterns of the 2-3 pull-down scheme and 2-2 pull-down scheme are exclusive from each other, competition of the identification results caused by the same field correlation pattern does not occur.

3) Pattern comparison is made on a field by field basis. In only the method described in 2) above, 2-3 pull-down scheme determination is made on a 5 by 5 field basis, and 2-2 pull-down scheme determination is made on a 2 by 2 field basis. In order to provide a structure in which no deviation of detection sensitivity occurs by equalizing the comparison count per unit time in both of the 2-3 pull-down scheme determination and the 2-2 pull-down scheme determination, a pattern obtained by rotating a bit phase of each comparison pattern is defined as a comparison pattern, and comparison and determination are made in parallel. In addition, speedy determination can be made with this structure. In both of the 2-3 pull-down scheme determination and 2-2 pull-down scheme determination, determination is made on a field by field basis, that is, determination is made by the same count in unit time. Thus, a determination sensitivity is not different from each other.

4) A hysteresis is provided between the 2-3 pull-down scheme determination and the 2-2 pull-down scheme determination. The introduction hysteresis and hold hysteresis are provided in each of the 2-3 pull-down scheme determination and the 2-2 pull-down scheme determination. In addition, an introduction hysteresis determined immediately before is set so as to be easily detected, and a hold hysteresis is set so as to be easily held. An introduction hysteresis which is not determined immediately before is set so as to be hardly detected, and a hold hysteresis is set so as to be hardly held. Here, upon comparison in generation frequency between a true pull-down scheme pattern and an incorrect determination inducing picture pattern generated depending on contents of a picture, the incorrect determination inducing picture pattern does not frequently occurs. Thus, by providing an introduction hysteresis, a case in which the number of the corresponding determinations does not meet the specified count is eliminated to prevent incorrect determination, and precise and stable determination is made. Further, a true pull-down scheme pattern is not always obtained. Thus, in the case where a deviation from the determination immediately before occurs, a deviation state up to a threshold value holds determination while expecting recovery. In this manner, an identification operation is stabilized. A hysteresis feature is provided between the 2-3 pull-down scheme determination and the 2-2 pull-down scheme determination, thus preventing incorrect determination. In addition, even in the case where an ideal pulled-down picture pattern is not obtained, a stable determination operation can be made. From the above-described 4 points, pull-down scheme identification can be performed at a practical level.

5) Moreover, pull-down scheme determination is made at a proper sensitivity according to an image of a picture (a picture with many motion picture scenes or with many still picture scenes).

In a process for obtaining a field correlation pattern from a field differential, the cumulative value of the pixels is gain-varied while it is amplified. The field correlation pattern described previously is obtained by cumulatively adding the number of motion picture pixels or still picture pixels.

In the case of a picture with a plenty of motions, since the number of motion picture pixels in cumulative value is large, it is counted up to a significant digit of the cumulative value counter. In the case of a picture with a few motion, since the number of motion picture pixels in cumulative value is small, it is not counted up to a significant digit of the cumulative value counter. The value of the cumulative value counter is so amplified according to a rate of the motion picture pixels in picture, that a large value can be obtained even if the motion is small. That is, a motion is emphasized to appear as if it were "heated over a fire" irrespective of whether or not a motion picture region is large or small in number, and the television/cinema scheme identification sensitivity is optimized. As described above, a precise, speedy, and stable television/cinema scheme identification feature can be obtained even for a picture with many still picture scenes as well as a picture with many motion picture scene irrespective of a rate of a motion picture section of a picture as described above.

As has been described above, in the embodiments of the present embodiment, it is possible to make pull-down scheme determination precisely and speedily with respect to a so-called "making" image on a DVD source in which a general video image and a film image as well as a CG pictures coexist. In addition, when the present invention is applied to, for example, progressive or sequential scanning line conversion, since a sequential scanning line conversion scheme according to an input picture can be selected, a high quality picture can be provided. Identification can be made speedily because television/cinema scheme identification is made on a field by field basis.

2-3 pull-down scheme detection and 2-2 pull-down scheme detection both are achieved from the same field correlation pattern, and thus, no deviation occurs with sensitivity of the 2-3 scheme detection and 2-2 pull-down scheme detection. In addition, since both detections are performed by a common detection circuit, a 2-3 or 2-2 pull-down scheme identification apparatus can be provided at a lower cost.

Furthermore, the same threshold value is used in common in the 2-3 pull-down scheme detection and 2-2 pull-down scheme detection, thus making it possible to reduce a burden of adjustment personnel of a television image receiver manufacturer for making adjustment of detection sensitivity. Further, exclusive comparison patterns are used for the 2-3 pull-down scheme detection and 2-2 pull-down scheme detection, thus making it possible carry out stable and precise determination without causing incorrect determination.

An exclusive hysteresis determined from an immediately preceding determination value is provided for the 2-3 pull-down scheme determination and 2-2 pull-down scheme determination, thus making it possible to carry out precise and stable determination without causing incorrect detection. Frequency change of an identification result is restrained by means of a pull-down scheme detecting mechanism having a hysteresis, thereby making it possible to provide a stable and defect-free picture.

Television/cinema scheme identification system is structurally featured in that incorrect determination hardly occurs, and types of threshold values are small in number, thus making it possible to significantly reduce a burden of adjustment personnel of a picture processing apparatus manufacturer for determining the threshold value. An NTSC zone 2-3 or 2-2 pull-down scheme and a PAL zone 2-2 pull-down scheme can be identified. Thus, by manufacturing the apparatus of the present invention as an IC, all the products can be shipped all over the world by one type IC. There is no need for designing ICs for each shipment destination, and concurrently, a picture processing device can be provided inexpensively by using the IC.

In addition, individual determination of the 2-3 or 2-2 pull-down scheme can be manually stopped, and thus, in a certain shipment destination, there can be readily provided a determination device in which no incorrect determination occurs by eliminating irrelevant determination in the certain shipment destination.

By an automatic gain control mechanism, advantageous effect of producing an emphasized motion picture cumulative value as if it were "heated over a fire" is achieved irrespective of whether a motion picture areas of an input picture is large or small in number, so that television/cinema scheme identification can be made precisely, speedily, and stably.

By the automatic gain control mechanism, television/cinema scheme identification can be precisely and speedily made in a wide range from a picture with many motion picture scenes to a picture with many still picture scenes by the same threshold value. In addition, it is possible to reduce a burden of adjustment personnel of a picture processing equipment manufacturer for determining the threshold value by a monitor.

The automatic gain control mechanism is controlled depending on the degree of still picture pixels so that the top and bottom no-picture sections appearing on a display of a cinema source can be automatically handled as a still picture. Therefore, there is no need for separately detecting the size of the top and bottom no-picture areas, and concurrently, an apparatus with its small circuit scale can be provided.

Moreover, as seen in a recent DVD picture, even if there coexist a variety of pulled-down video signals, for example, a 2-3 pulled-down video signal, a 2-2 pulled-down video signal, and a general video signal, automatic identification of scheme of that source can be made precisely, speedily, and stably. In addition, if the present invention has been applied to processing according to a picture type, for example, sequential scanning line conversion, a high quality picture is obtained. A pull-down scheme determination method depends on a field differential or a frame differential of a picture signal, thus making it difficult to carry out detection by a picture in a conventional identification method. For example, detection is difficult in a scene in which still pictures are continuous. Therefore, a stable television/cinema scheme identification feature is obtained irrespective of a rate of a motion picture section of a picture according to the present invention. In addition, an adjustment work of a picture processing equipment engineer can be easily carried out, and reduction of an adjustment period can be achieved.

Sections configuring essential sections of the above described embodiments are summarized as follows.

(1) There is provided an automatic determination apparatus of a picture signal for detecting a pull-down scheme thereof when the picture signal having a field frequency has been converted.

(2) The signal common processing section 100 acquires a motion or still picture pixel determination output obtained by identifying a motion picture or a still picture on a field by field basis in a plurality of fields, and outputs the acquired output as a field correlation pattern.

(3) The first pull-down detecting section 60 obtains a determination output in a first type of pull-down scheme by using the field correlation pattern.

(4) The second pull-down detecting section 70 obtains a determination output in a second type pull-down scheme by using the field correlation pattern.

(5) The hysteresis setting section 80 sets hysteresis features with respect to each of the response characteristics of the first pull-down detecting section 60 and the second pull-down detecting section 70.

Here, the signal common processing section 100 comprises: a field differential information acquiring section 10 for obtaining field differential information; an absolute value acquiring section 20 for obtaining an absolute value of the field differential information; a motion picture pixel acquiring section 30 for determining a motion picture pixel from the absolute value, and outputting the determination of the motion picture pixel; a cumulatively adding section 40 for cumulatively adding the motion picture pixel determination output by 1 field; and a field correlation pattern generating section 50 in which a cumulative value from the cumulatively adding section is compared with a threshold value, correlation determination outputs are obtained by making identification of a motion picture or a still picture on a field by field basis, and the correlation determination outputs are processed to generate a field correlation pattern.

In addition, in the embodiment of the present invention, the signal common processing section 100 comprises: motion picture pixel acquiring sections 107, 108 for determining a motion picture pixel from the absolute value, and providing a determination output of the motion picture pixel; a motion picture pixel cumulatively adding section 110 for cumulatively adding the motion picture pixel determination output by 1 field; still picture pixel acquiring sections 208, 207 for determining a still picture pixel from the absolute value, and providing the still picture pixel determination output; and a still picture pixel cumulative adding section 210 for cumulatively adding the still picture pixel determination output by 1 field. The common processing section 100 comprises: gain variable circuits 212 and 213 for, as an output value of the still picture pixel cumulative adding section 210 increases, increasing a gain of an output from the motion picture pixel cumulative adding section 110; and a generating section 50 for comparing an output value from the gain variable circuits 212 and 213 with a threshold value, obtaining a correlation determination output on a field by field basis, and generating a field correlation pattern generated by patterning a correlation determination output by a plurality of fields. Monitor terminals 217, 218 for monitoring a gain-controlled value are provided at an output section of the gain variable circuits to facilitate adjustment.

The first pull-down detecting section 60 and the second pull-down detecting section 70 are equal in data length to the first and second comparison patterns with which the field correlation pattern is compared. In addition, in the case where an appearance pattern of motion picture pixel determination and still picture pixel determination with respect to the first type pull-down scheme has been compared with an appearance pattern of the motion picture pixel determination and still picture pixel determination with respect to the second type pull-down scheme, a data length giving exclusive patterns is employed.

In the above-mentioned embodiment, the first pull-down detecting section 60 and the second pull-down detecting section 70 are equal in data length of 6-bit to the first and second comparison patterns with which the field correlation pattern is compared. A different data length of at least 6-bit may be used. For example, 10-bit data length which is determined as the least common multiple of 2-bit and 5-bit may be used.

The first pull-down detecting section 60 has a plurality of first comparison patterns obtained by rotating a bit phase of a first comparison pattern. The field correlation pattern is compared in parallel with the plurality of first comparison patterns. When this field correlation pattern coincides with one of the first comparison patterns, a determination output of the first type pull-down scheme is obtained.

The second pull-down detecting section 70 has a plurality of second comparison patterns obtained by rotating a bit phase of a second comparison pattern. The field correlation pattern is compared in parallel with the plurality of second comparison patterns. When this field correlation pattern coincides with any of the second comparison patterns, a determination output of the second type pull-down scheme is obtained. By the above setting, the comparison times per unit time are equalized in both of the first type pull-down scheme determination and the second type pull-down scheme determination so as not to produce a deviation of detection sensitivity.

The first type pull-down scheme detecting section 123 has an introduction hysteresis as a response feature with respect to a primary determination output, and has a hold hysteresis as an output feature for changing a hold state of a current determination output. The second type pull-down scheme detecting section 133 also has an introduction hysteresis as a response feature with respect to a primary determination output, and has a hold hysteresis as an output feature for changing a hold state of a current determination output. In this manner, the introduction hysteresis in each of a first type pull-down scheme secondary determining section and a second type pull-down scheme secondary determining section is set so as to easily respond to an input which is identical to the current determination output and so as to hardly respond to an input which is different from the current determination output. The hold hysteresis is set so as to easily hold the current determination output and so as to hardly respond to switching of an output which is different from the current determination output.

In addition, a correlation determination output obtained by making identification as to whether a motion picture or a still picture is produced on a field by field basis. Further, the field may be divided into a plurality of blocks, and a plurality of correlation outputs are obtained in correspondence with a plurality of blocks of each field. The first pull-down detecting section 60 outputs identification information indicating which of the first comparison patterns coincides with an input field correlation pattern. The second pull-down detecting section 70 also outputs identification information indicating which of the second comparison patterns coincides with the input field correlation pattern.

Outputs from the first type and second type pull-down scheme detecting sections 123, 133 are inputted to the selection logic section 90. From this selection logic section 90, a current determination output is outputted, the determination output being obtained by identifying a current input signal scheme. The current determination output is used for controlling a switch for selecting an input of a speed converter circuit of a motion adaptive type scanning line converter circuit 315. A section for obtaining the field differential information has the first field delay circuit 102, the second field delay section 301, and the subtracting section 105 for obtaining a differential signal between input side and output side signals of the first field delay section 102.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A television/cinema scheme identification apparatus for a picture signal having a field frequency, for identifying a pull-down scheme when a picture source of the picture signal has been subjected to conversion processing, the identification apparatus comprising:

a signal processing section which acquires a correlation identification output obtained by identifying the presence or absence of correction of a pattern on a field by field basis by a plurality of continuous fields, and outputs an acquired output as a field correlation pattern;

a first pull-down identifying section which compares the field collection pattern with a first comparison pattern, and, as a result of the comparison, acquires an identification output of a first type pull-down scheme; and a second pull-down identifying section which compares the field correlation pattern with a second comparison pattern, and as a result of the comparison, acquires an identification output of a second type pull-down scheme, wherein the field correlation pattern is identical in data length to the first and second comparison patterns with which the field correlation pattern is compared, and an appearance pattern of correlation identification for the first type pull-down scheme and an appearance pattern of correlation identification for the second type pull-down scheme each have a data length such that a mutually exclusive pattern relationship is established.

2. A television/cinema scheme identification apparatus according to claim 1, wherein the first comparison pattern is included in a plurality of first group comparison patterns obtained by rotating a bit phase of the first comparison pattern, the second comparison pattern is included in a plurality of second group comparison patterns obtained by rotating a bit phase of the second comparison pattern, the first pull-down identifying section has a first comparing section which compares in parallel the field correlation pattern with respect to said plurality of first group comparison patterns and a first output section which, when the field correlation pattern coincides with a first comparison pattern of any phase in the first group comparison patterns, obtains a determination output of the first type pull-down scheme, the second pull-down identifying section has a second comparing section which compares in parallel the field correlation pattern with said plurality of second group comparison patterns and a second output section which, when the field correlation pattern coincides with a second comparison pattern of any phase in the second group comparison patterns, obtains a determination output of the second type pull-down scheme, and the field correlation pattern is supplied to the first and second pull-down identifying sections in parallel at the same time.

3. A television/cinema scheme identification apparatus according to claim 1, wherein a comparison time per unit time is set to be equal to another at the first comparing section and the second comparing section.

4. A television/cinema scheme identification apparatus according to claim 1,
wherein the first type pull-down scheme is a 2-3 pull-down scheme and the second type pull-down scheme is a 2-2 pull-down scheme, and
the first and second comparison patterns are patterns of a plurality of continuous bits, and a data length thereof is set so as to include at least either of 6 bits and 10 bits.

5. A television/cinema scheme identification apparatus according to claim 1, wherein the signal processing section comprises:
a field differential information acquiring section to which the picture signal is supplied, and which obtains field differential information;
an absolute value acquiring section which obtains an absolute value of the field differential information;
a motion picture pixel acquiring section which determines a motion picture pixel from the absolute value, and provides a motion picture pixel determination output;
a motion picture pixel cumulatively adding section which cumulatively adds the motion picture pixel determination output by 1 field;
a still picture pixel acquiring section which determines a still picture pixel from the absolute value, and provides a still picture pixel determination output;
a still picture pixel cumulatively adding section which cumulatively adds the still picture pixel determination output by 1 field;
gain variable circuit configured to, as an output value of the still picture pixel cumulatively adding section increases, increase a gain of an output from the motion picture pixel cumulatively adding section; and
a generating section which compares the output value from the gain variable circuit with a predetermined threshold value, obtains a pattern determination output on a field by field basis, and generates the field correlation pattern.

6. A television/cinema scheme identification apparatus according to claim 5, wherein a monitor terminal to monitor a gain-controlled value is provided at an output section of the gain variable circuit.

7. A television/cinema scheme identification apparatus according to claim 1, wherein the field is divided into a plurality of blocks, and there are obtained a plurality of block correlation patterns for obtaining a pull-down scheme determination value in correspondence with a plurality of blocks of each field.

8. A television/cinema scheme identification apparatus for a picture signal having a field frequency, for identifying a pull-down scheme when a picture source of the picture signal has been subjected to conversion processing, the identification apparatus comprising:
a signal processing section which acquires a correlation determination output obtained by identifying the presence or absence of correlation of an image on a field by field basis by a plurality of continuous fields, and outputs the acquired output as a field correlation pattern;
a first pull-down scheme identifying section including:
a first primary determining section which compares the field correlation pattern with a first comparison pattern of a first type pull-down scheme, and obtains a primary determination output on a field by field basis; and
a first secondary determining section having an introduction hysteresis as a response feature with respect to the first primary determination output, and having a hold hysteresis as an output feature for changing a hold state of a current determination output; and
a second pull-down scheme identifying section including:
a second primary determining section which compares the field correlation pattern with a second comparison pattern of a second type pull-down scheme, and obtains a primary determination output on a field by field basis; and
a second secondary determining section having an introduction hysteresis as a response feature with respect to the second primary determination output, and having a hold hysteresis as an output feature for changing a hold state of a current determination output,
wherein the introduction hysteresis in each of the first and second secondary determining sections is set so as to respond to an input which is identical to the current determination output more easily than to an input which is different from the current determination output, and the hold hysteresis is set so as to hold the current determination output more easily than switching the current determination output into an output which is different from the current determination output.

9. A television/cinema scheme identification apparatus according to claim 8, wherein the first type pull-down scheme is a 2-3 pull-down scheme, and the second type pull-down scheme is a 2-2 pull-down scheme.

10. A television/cinema scheme identification apparatus according to claim 8, wherein the field is divided into a plurality of blocks, and there are obtained a plurality of block correlation patterns for obtaining a pull-down scheme determination value in correspondence with a plurality of blocks of each field.

11. A television/cinema scheme identification apparatus according to claim 8, further comprising a motion adaptive type scanning line converting section having a scanning line generator circuit which generates an interpolation scanning line with respect to a field image,
wherein an identification output of a pull-down type of the first and second pull-down scheme identifying sections is supplied as a control signal to the scanning line generator circuit for the purpose of scanning line interpolation.

12. A television/cinema scheme identification apparatus according to claim 11,
wherein the scanning line generator circuit includes an intra-field interpolation scanning line generator circuit, and an inter-field interpolation scanning line generator circuit,
the motion adaptive type scanning line converting section has a motion detector circuit which detects a motion of an image in the field, and a mixer circuit which mixes outputs of the intra-field interpolation scanning line generator circuit and the inter-field interpolation scanning line generator circuit, and
a mixture ratio in the mixer circuit is controlled in accordance with the magnitude of an output of the motion detector circuit.

13. A television/cinema scheme identification apparatus according to claim 8,
wherein each of the first and second secondary determining sections comprises:
a first counter which counts a primary determination output of the first pull-down determining section;
an output circuit which, when a count value of the first counter has exceeded a predetermined value, outputs and latches a secondary pull-down determination value;
a second counter which counts a count when the primary determination output of the primary pull-down determining section and the secondary pull-down determination value do not coincide with each other; and
a reset circuit which, when a count value of the second counter has exceeded a predetermined value, resets the secondary pull-down determination value from the output circuit.

14. A television/cinema scheme identification apparatus according to claim 8,
wherein the first pull-down detecting section which obtains the determination output of the first type pull-down scheme outputs identification information indicating which of said plurality of first comparison patterns coincides with the field correlation pattern, and
the second pull-down detecting section which obtains the determination output of the second type pull-down scheme also outputs identification information indicating which of said plurality of second comparison patterns coincides with the field correlation pattern.

15. A television/cinema scheme identification method for a picture signal having a field frequency, for identifying a pull-down scheme when a picture source of the picture signal has been subjected to conversion processing, the identification method comprising:
acquiring a correlation identification output obtained by identifying the presence or absence of correction of an image on a field by field basis by a plurality of continuous fields, to output the acquired output as a field correlation pattern;
comparing the field collection with a first comparison pattern, and, as a result of the comparison, to acquire an identification output of a first type pull-down scheme; and comparing the field correlation pattern with a second comparison pattern, and as a result of the comparison, to acquire an identification output of a second type pull-down scheme,
wherein the field correlation pattern is set to be identical in data length to the first and second comparison patterns with which the field correlation pattern is compared, and an appearance pattern of correlation identification for the first type pull-down scheme and an appearance pattern of correlation identification for the second type pull-down scheme each have a data length such that a mutually exclusive pattern relationship is established.

16. A television/cinema scheme identification method according to claim 15,
wherein the first comparison pattern has a plurality of first group comparison patterns obtained by rotating a bit phase,
the second comparison pattern has a plurality of second group comparison patterns obtained by rotating a bit phase,
the first pull-down identification compares in parallel the field correlation pattern with respect to said plurality of first group comparison patterns, and when the field correlation pattern coincides with a first comparison pattern of any phase, obtains a determination output of the first type pull-down scheme,
the second pull-down identification compares in parallel the field correlation pattern with said plurality of second group comparison patterns, and when the field correlation pattern coincides with a second comparison pattern of any phase, obtains a determination output of the second type pull-down scheme, and
the field correlation pattern is supplied at the time of the first and second pull-down identifications in parallel at the same time.

17. A television/cinema scheme identification method according to claim 15, further comprising:
comparing the field correlation pattern with a first comparison pattern of a first type pull-down scheme and obtaining a primary determination output on a field by field basis;
obtaining a secondary determination output of the first type pull-down scheme having an introduction hysteresis as a response characteristic with respect to the primary determination output, and having a hold hysteresis as an output characteristic for changing a hold state of a current determination output;
comparing the field correlation pattern with a second comparison pattern of a second type pull-down scheme and obtaining a primary determination output on a field by field basis; and
obtaining a second determination output of the second type pull-down scheme having an introduction hysteresis as a response characteristic with respect to the primary determination output, and having a hold hysteresis as an output characteristic for changing a hold state of a current determination output,
wherein the introduction hysteresis in each of the secondary determination output of the first type pull-down scheme and the secondary determination output of the second type pull-down scheme is set so as to respond to an input which is identical to the current determination output more easily than an input which is different from the current determination output, and the hold hysteresis is set so as to hold the current determination output more easily than switching the current determination output to an output which is different from the current determination output.

18. A television/cinema scheme identification method according to claim 15,
wherein the field correlation pattern generating comprises:
obtaining field differential information from the picture signal, obtaining an absolute value of the field differential information, determining a motion picture pixel from the absolute value to provide a motion picture pixel determination output, and cumulatively adding the motion picture pixel determination output by 1 field;
determining a still picture pixel from the absolute value to provide a still picture pixel determination output, and cumulatively adding the still picture pixel determination output by 1 field;
increasing a gain of an output of a cumulative output value of the motion picture pixel, as a cumulative output value of the still picture pixel increases; and
comparing the gain-controlled output value with a predetermined threshold value, obtaining a correlation determination output on a field by field basis, and patterning and outputting a correlation determination output for a plurality of fields.

19. A television/cinema scheme identification method according to claim 15,
wherein the first comparison pattern of the first type pull-down scheme is a plurality of comparison patterns obtained by rotating a bit phase, the field correlation patterns are compared in parallel with said plurality of first comparison patterns, and, when the field correlation patterns coincide with any first comparison pattern, the determination output of the first type pull-down scheme is obtained,
the second comparison pattern of the second type pull-down scheme is a plurality of second comparison patterns obtained by rotating a bit phase, the field correlation patterns are compared in parallel with said plurality of second comparison patterns, and, when the field correlation patterns coincide with any first comparison pattern, the determination output of the second type pull-down scheme is obtained, and
the pull-down scheme determination of the first type and the pull-down scheme determination of the second type are equalized in comparison times per unit time.

20. A television/cinema identification method according to claim 15, further comprising:
detecting a motion of the field image; and
performing scanning line interpolation of the field image depending on a magnitude of the motion.

* * * * *